(12) United States Patent
Sasaki et al.

(10) Patent No.: US 10,061,419 B2
(45) Date of Patent: Aug. 28, 2018

(54) DISPLAY DEVICE

(71) Applicant: Japan Display Inc., Tokyo (JP)

(72) Inventors: Tohru Sasaki, Tokyo (JP); Hajime Akimoto, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/583,089

(22) Filed: May 1, 2017

(65) Prior Publication Data

US 2017/0344163 A1 Nov. 30, 2017

(30) Foreign Application Priority Data

May 31, 2016 (JP) ................................. 2016-108187

(51) Int. Cl.
*G06F 3/045* (2006.01)
*G06F 3/041* (2006.01)
*G06F 3/044* (2006.01)

(52) U.S. Cl.
CPC ............ *G06F 3/0412* (2013.01); *G06F 3/044* (2013.01); *G06F 2203/04102* (2013.01); *G06F 2203/04103* (2013.01)

(58) Field of Classification Search
CPC .................. G06F 3/0412; G06F 3/044; G06F 2203/04102; G06F 2203/04103
USPC ......................................................... 345/174
See application file for complete search history.

(56) References Cited

U.S. PATENT DOCUMENTS

| | | | | |
|---|---|---|---|---|
| 4,597,635 | A | * | 7/1986 | Hoshikawa ....... G02F 1/133305 349/139 |
| 6,501,528 | B1 | * | 12/2002 | Hamada ............ G02F 1/133305 345/4 |
| 2012/0162099 | A1 | * | 6/2012 | Yoo ........................ G06F 3/0412 345/173 |
| 2014/0246687 | A1 | * | 9/2014 | Ha ........................ G06F 1/1626 257/88 |

FOREIGN PATENT DOCUMENTS

| | | |
|---|---|---|
| JP | 2001-117719 A | 4/2001 |
| JP | 2001-154178 A | 6/2001 |
| KR | 10-2012-0072793 A | 7/2012 |

OTHER PUBLICATIONS

Taiwanese Office Action dated Oct. 18, 2017 for the corresponding Taiwanese patent application No. 106110469 with partial English Translation.
Korean Office action dated Jun. 19, 2018 for corresponding Korean patent application No. 10-2017-0056125, with partial translation.

* cited by examiner

*Primary Examiner* — Mark Edwards
(74) *Attorney, Agent, or Firm* — Typha IP LLC

(57) ABSTRACT

Provided is a display device including: a base film having a display region, a touch region, and a boundary region between the display region and the touch region; an image-displaying portion in the display region and on a first face side of the base film; and a touch portion in the touch region and on a second face side of the base film. The boundary region is sandwiched between the image-displaying portion and the touch portion, and the base film is folded in the boundary region so that a front face of the touch portion overlaps with the image-displaying portion with the touch portion interposed therebetween.

20 Claims, 28 Drawing Sheets

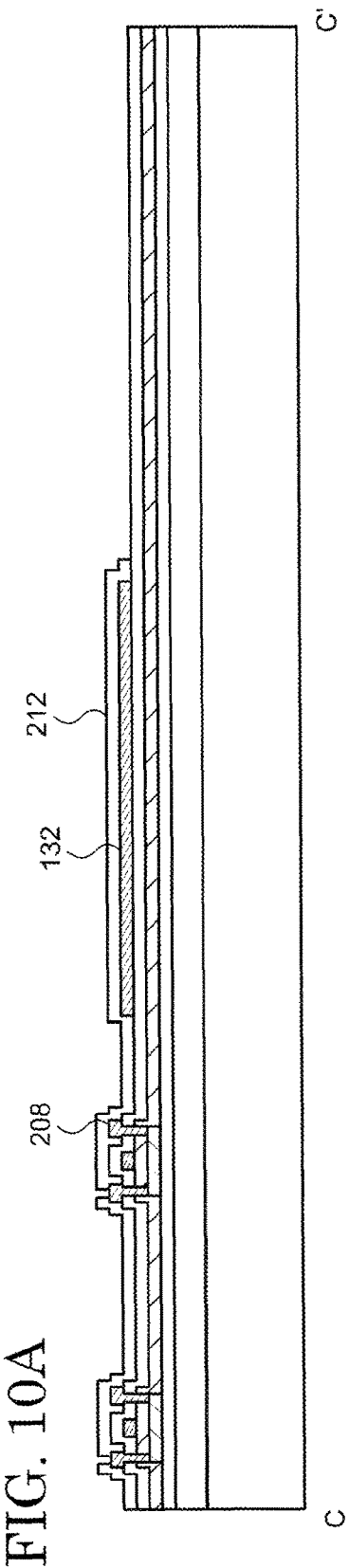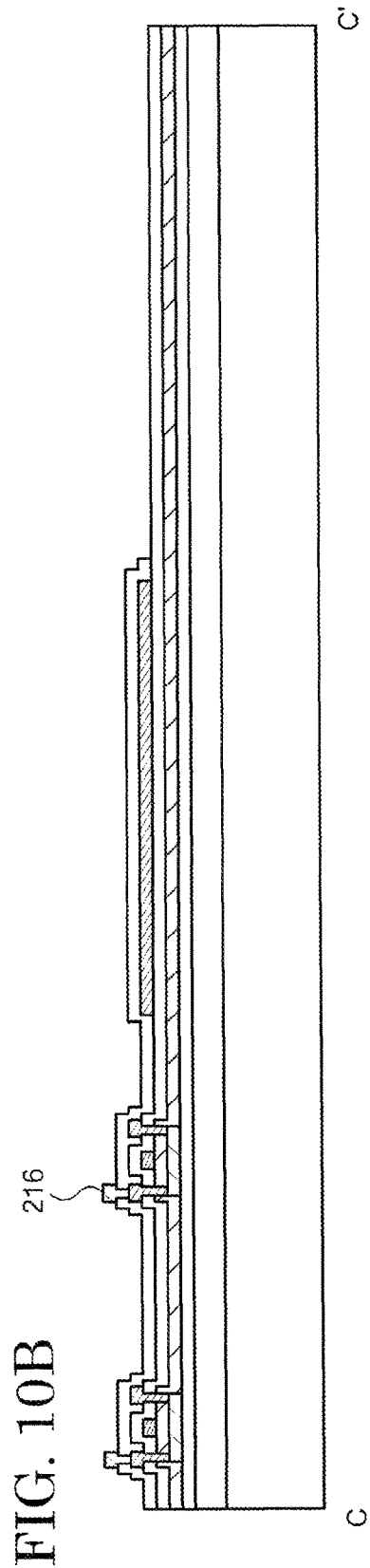

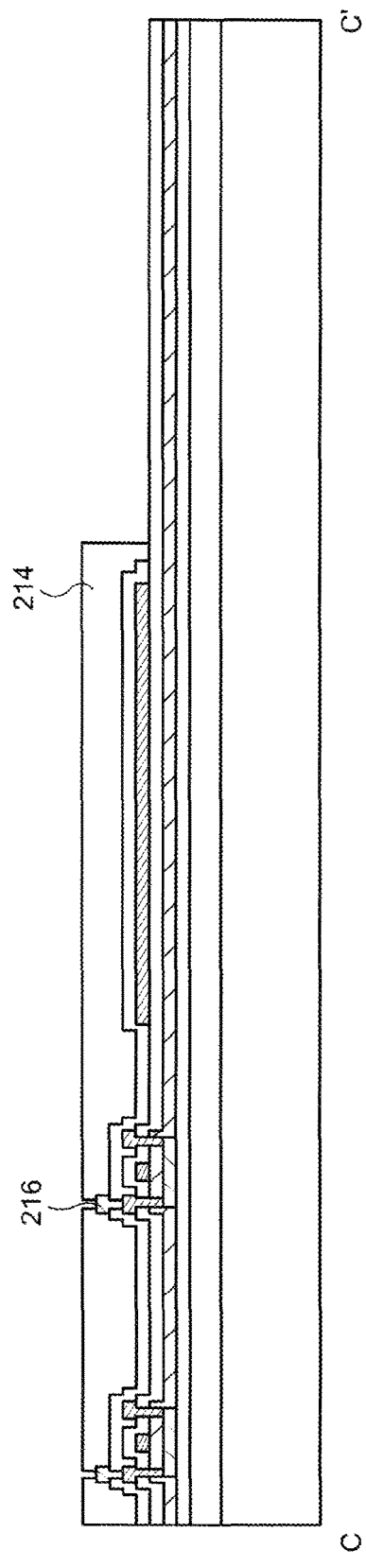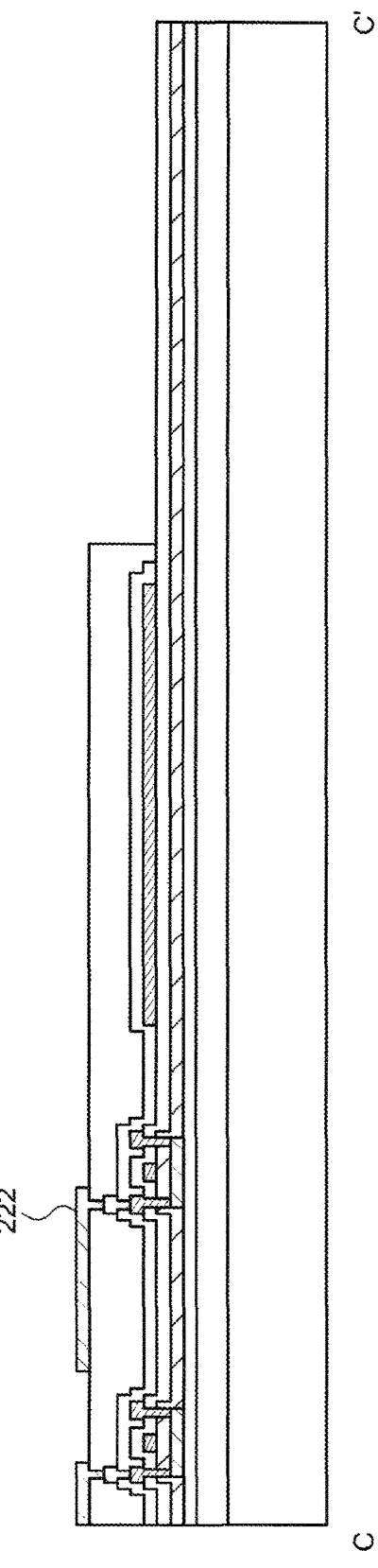

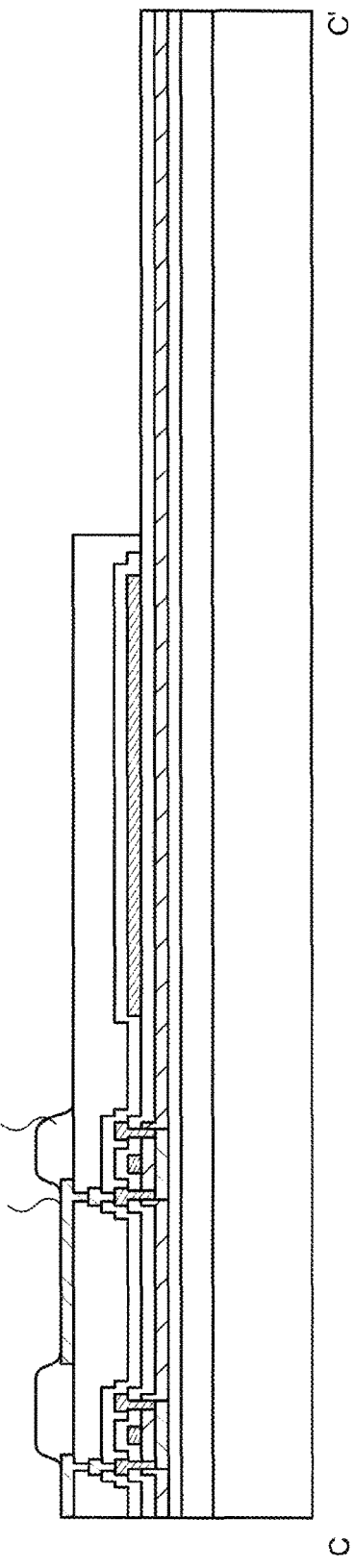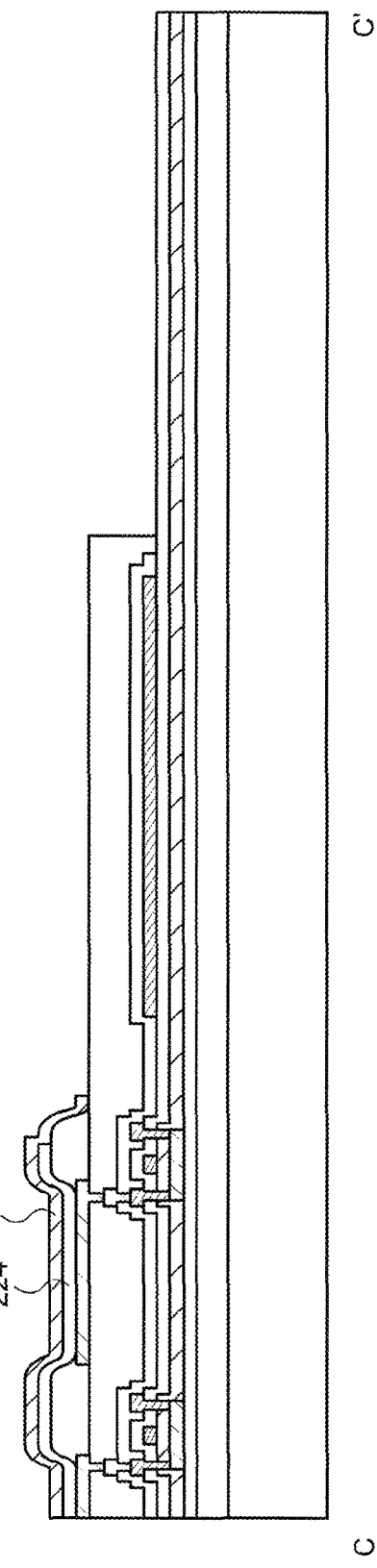

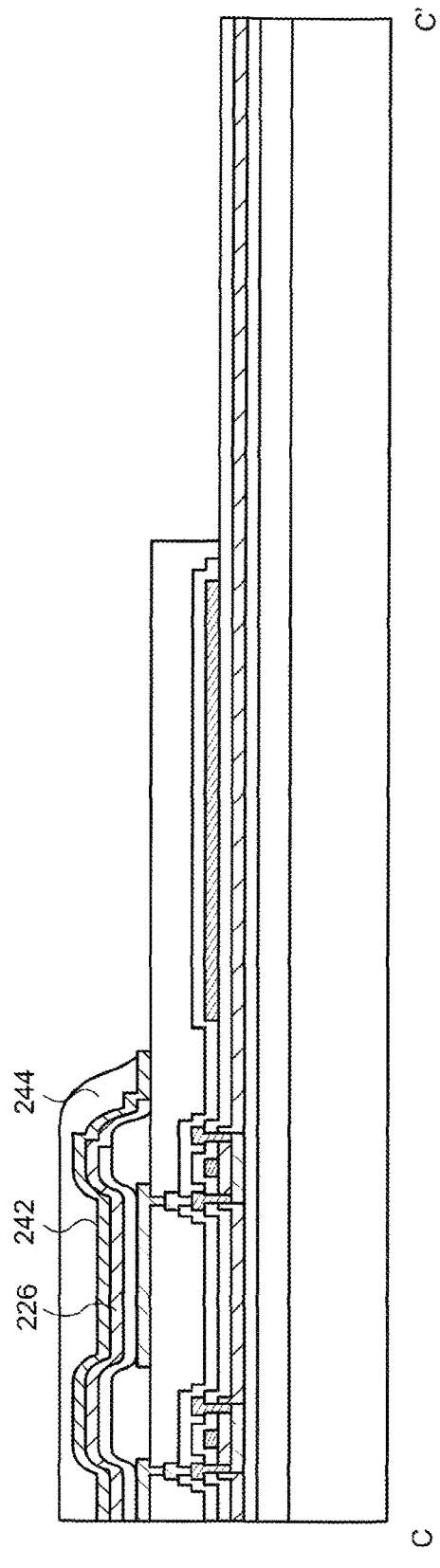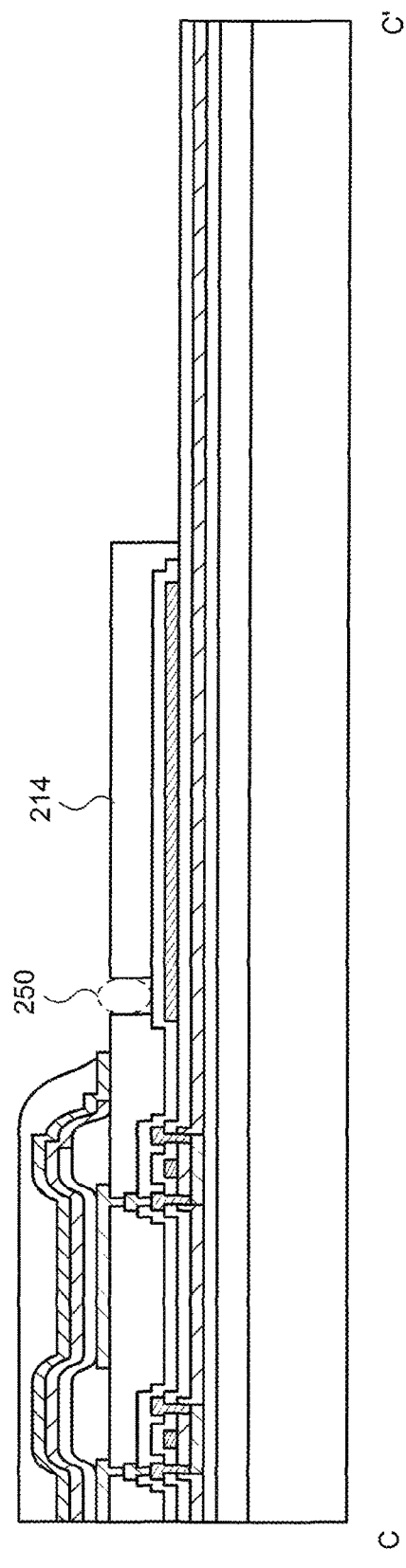

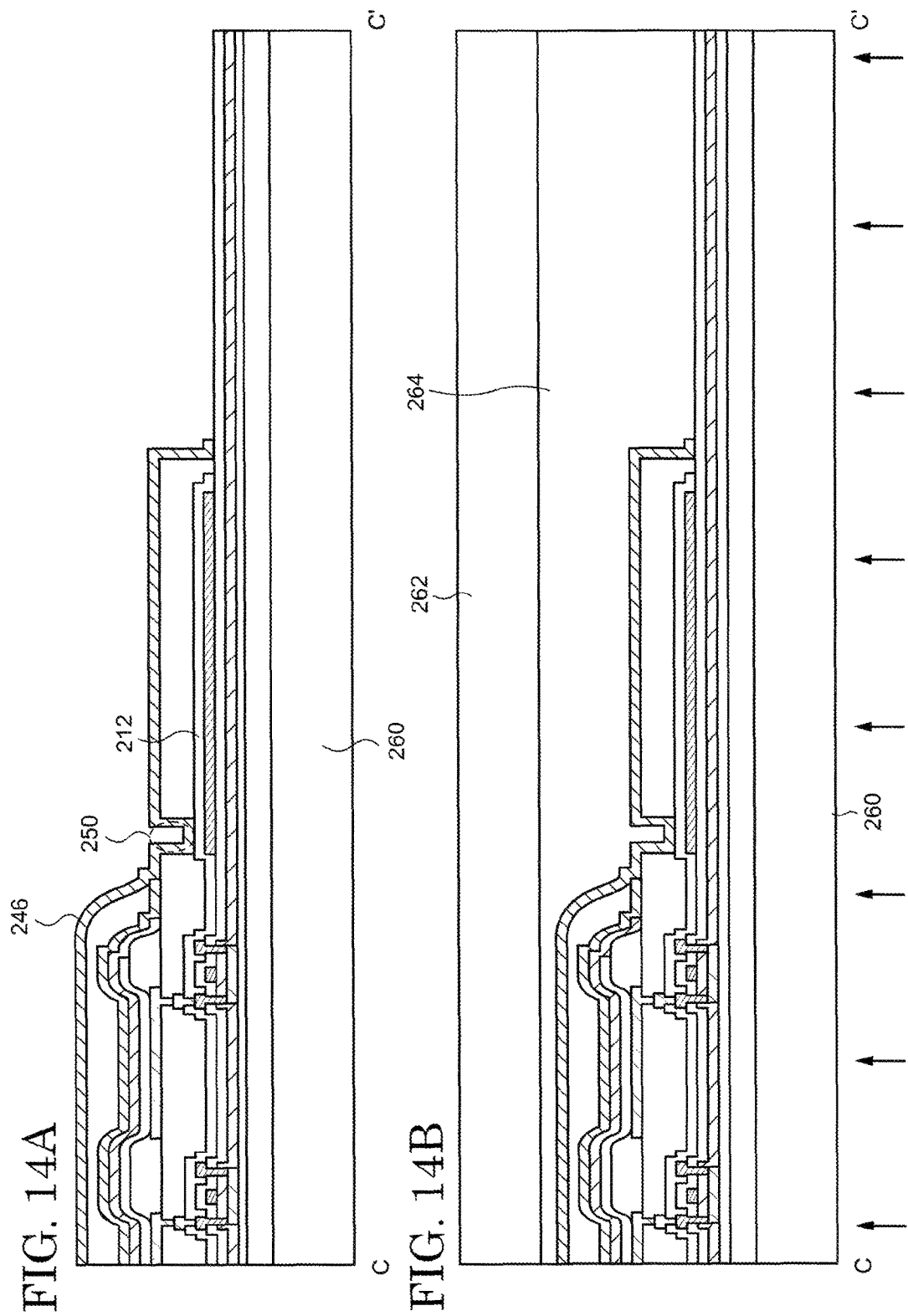

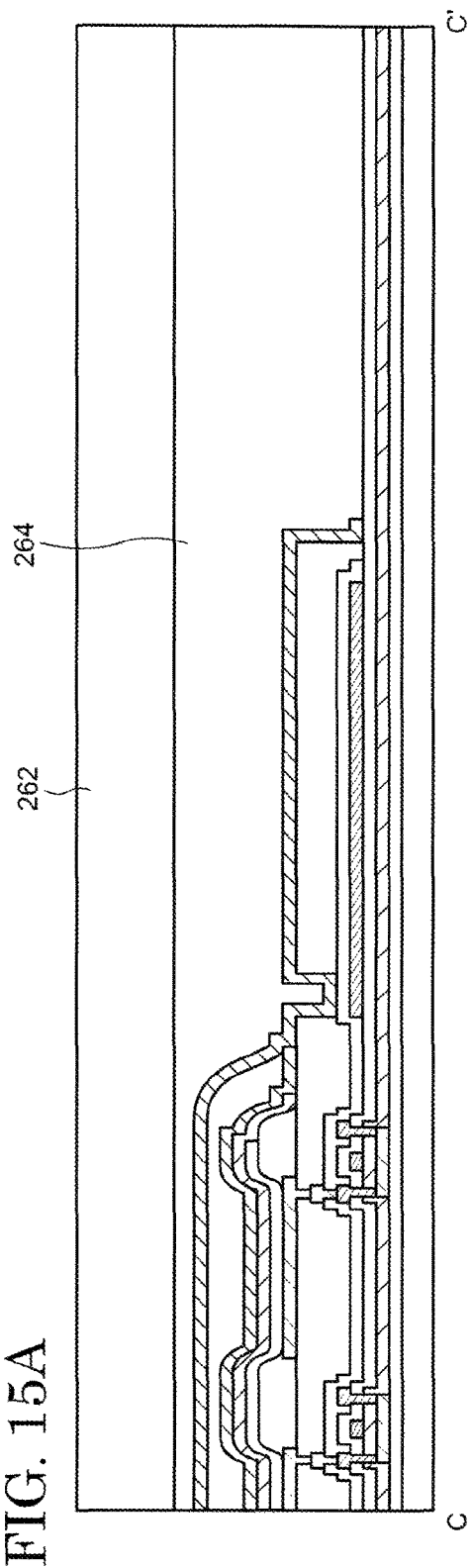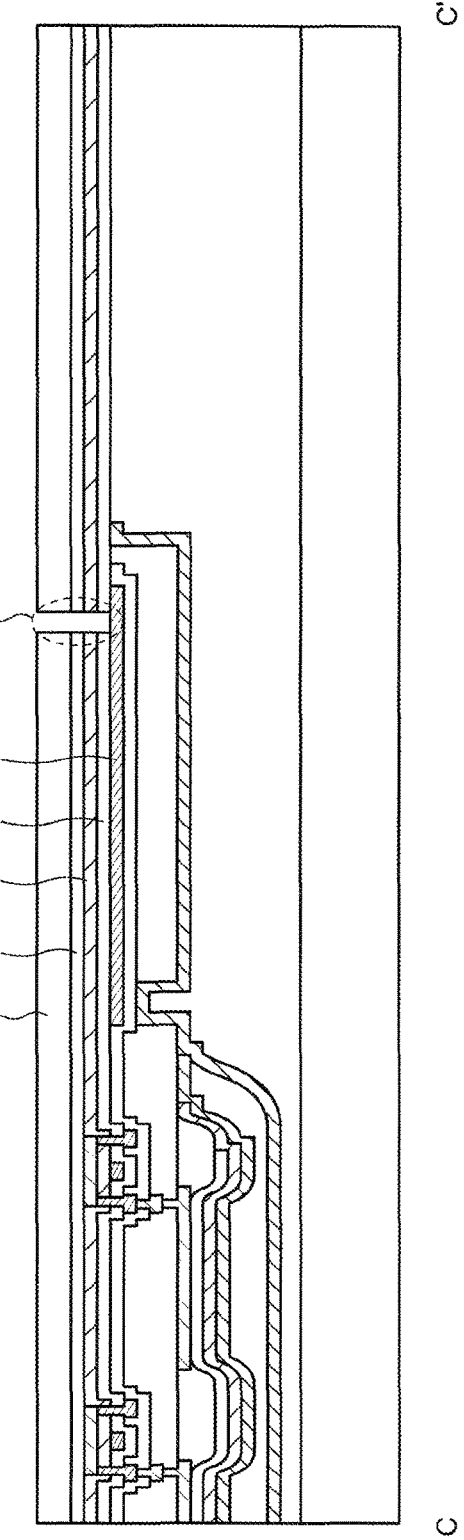

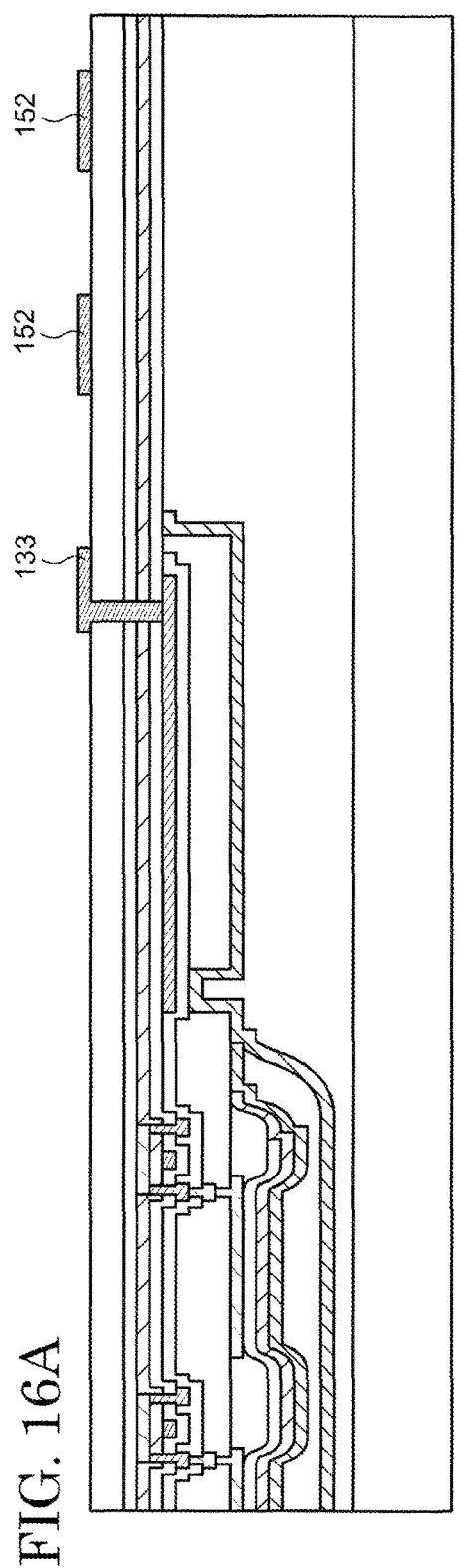
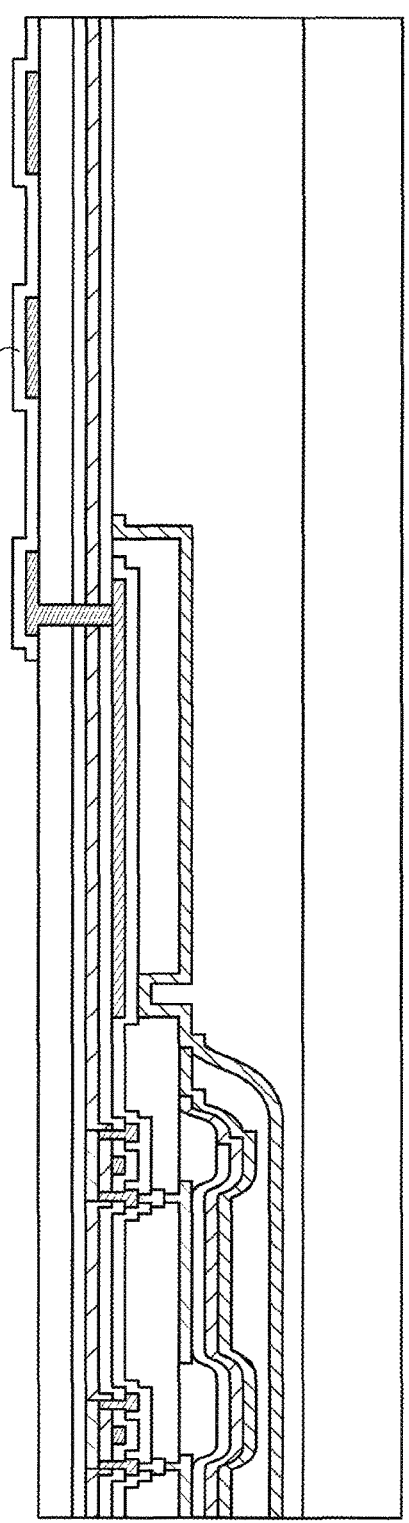

DISPLAY DEVICE

CROSS REFERENCE TO RELATED APPLICATIONS

This application is based on and claims the benefit of priority from the prior Japanese Patent Application No. 2016-108187, filed on May 31, 2016, the entire contents of which are incorporated herein by reference.

FIELD

An embodiment of the present invention relates to a display device such as an organic EL display device and a manufacturing method thereof. For example, an embodiment of the present invention relates to a display device on which a touch panel is mounted and a manufacturing method thereof.

BACKGROUND

A touch panel has been known as an interface for a user to input information to a display device. Arrangement of a touch panel on a screen of a display device permits a user to operate input buttons and icons displayed on the screen, by which information can be readily input to the display device. For example, a stacked-type display device in which a touch panel is mounted on a liquid crystal display device is disclosed in Japanese patent applications No. 2001-154178 and 2001-117719.

SUMMARY

An embodiment of the present invention is a display device including: a base film having a display region, a touch region and a boundary region between the display region and the touch region; an image-displaying portion in the display region and on a first face side of the base film; and a touch portion in the touch region and on a second face side of the base film. The boundary region is sandwiched between the image-displaying portion and the touch portion, and the base film is folded in the boundary region so that a front face of the touch portion overlaps with the image-displaying portion with the touch portion interposed therebetween. The front face of the touch portion is one of opposing faces of the touch portion further from the base film than the other.

An embodiment of the present invention is a display device including: a base film having a display region, a touch region and a boundary region between the display region and the touch region; and an image-displaying portion in the display region; and a touch portion in the touch region. The display device has a terminal located in the display region and electrically connected to the touch portion with a wiring extending to the touch region from the display region through the boundary region. The base film is folded in the boundary region so that a front face of the touch portion overlaps with the image-displaying portion with the touch portion interposed therebetween. The front face of the touch portion is one of opposing faces of the touch portion further from the base film than the other.

An embodiment of the present invention is a manufacturing method of a display device, the manufacturing method including: forming an image-displaying portion on a first face side of a base film; forming a touch portion on a second face side of the base film; and folding the base film so that the touch portion overlaps with the image-displaying portion and the image-displaying portion is enclosed by the base film.

BRIEF DESCRIPTION OF DRAWINGS

FIG. 10A and FIG. 10B are schematic cross-sectional views showing a manufacturing method of a display device according to an embodiment of the present invention;

FIG. 11A and FIG. 11B are schematic cross-sectional views showing a manufacturing method of a display device according to an embodiment of the present invention;

FIG. 12A and FIG. 12B are schematic cross-sectional views showing a manufacturing method of a display device according to an embodiment of the present invention;

FIG. 13A and FIG. 13B are schematic cross-sectional views showing a manufacturing method of a display device according to an embodiment of the present invention;

FIG. 14A and FIG. 14B are schematic cross-sectional views showing a manufacturing method of a display device according to an embodiment of the present invention;

FIG. 15A and FIG. 15B are schematic cross-sectional views showing a manufacturing method of a display device according to an embodiment of the present invention;

FIG. 16A and FIG. 16B are schematic cross-sectional views showing a manufacturing method of a display device according to an embodiment of the present invention;

DESCRIPTION OF EMBODIMENTS

Hereinafter, the embodiments of the present invention are explained with reference to the drawings. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, they are only an example, and do not limit the interpretation of the invention. In the specification and the drawings, the same reference number is provided to an element that is the same as that which appears in preceding drawings, and a detailed explanation may be omitted as appropriate.

In the present invention, when a plurality of films is formed by processing one film, the plurality of films may have functions or rules different from each other. However, the plurality of films originates from a film which is formed as the same layer in the same process. Therefore, the plurality of films is defined as films existing in the same layer.

In the specification and the scope of claims, unless specifically stated, when a state is expressed where a structure is arranged "over" another structure, such an expression includes both a case where the substrate is arranged immediately above the "other structure" so as to be in contact with the "other structure" and a case where the structure is arranged over the "other structure" with an additional structure therebetween.

First Embodiment

1. Outline Structure

In this embodiment, explanation with respect to a structure of a display device 100 according to an embodiment of the present invention is given by using FIG. 1A to FIG. 6.

1. Outline Structure

Figure 1A:
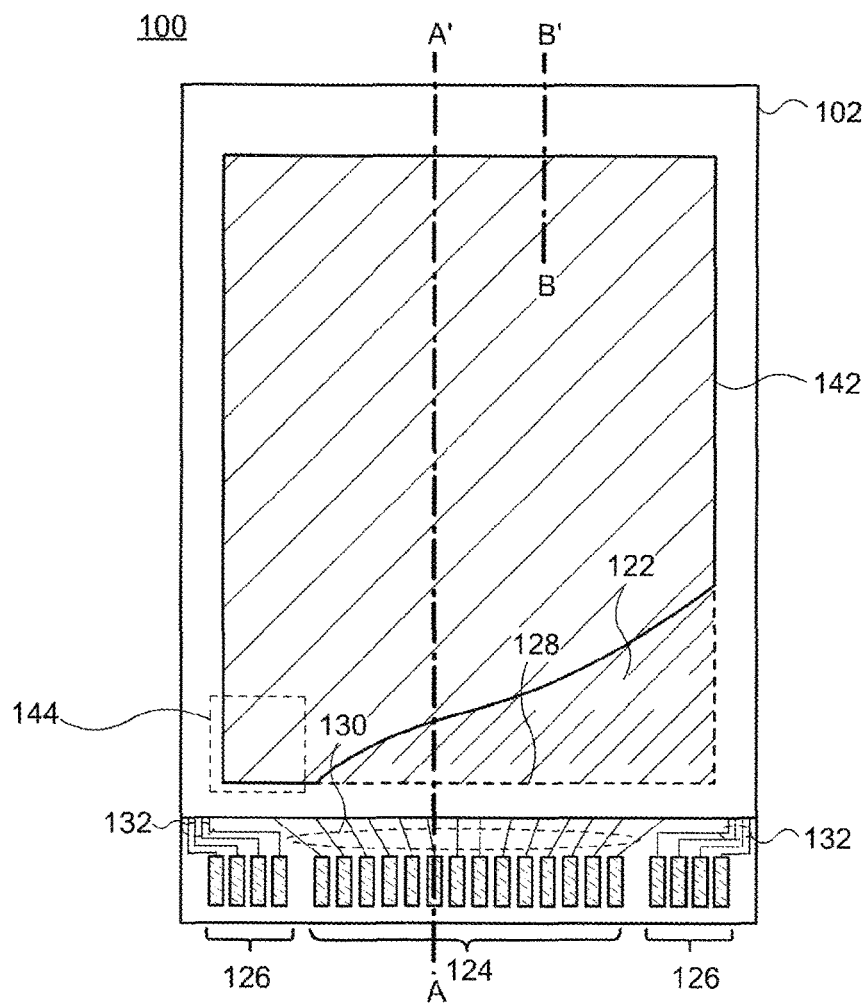
FIG. 1A and FIG. 1B are schematic top views of a display device according to an embodiment of the present invention.
Figure 1B:
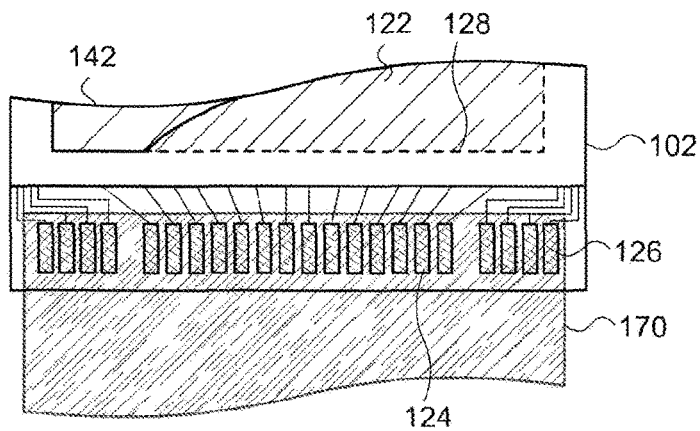
Figure 2:
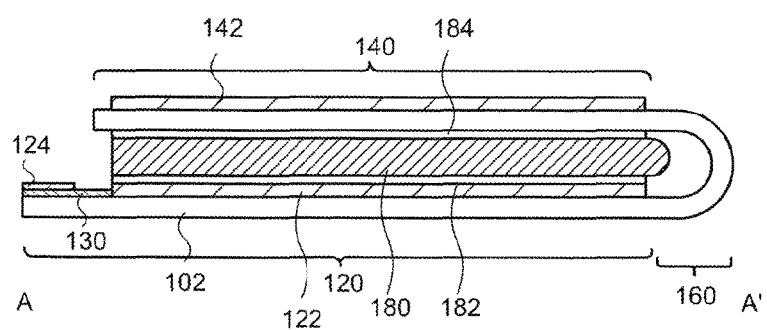
FIG. 2 is a schematic cross-sectional view of a display device according to an embodiment of the present invention.

Schematic top views of the display device 100 are shown in FIG. 1A and FIG. 1B, and a cross-sectional view along a chain line A-A' is shown in FIG. 2. As shown in FIG. 2, the display device 100 has a base film 102, and the base film 102 possesses a display region 120, a touch region 140, and a boundary region 160 between the display region 120 and the touch region 140. The touch region 140 is positioned in the display region 120 and overlaps with the display region 120. The boundary region 160 connects the display region 120 to the touch region 140. The base film 102 is a plate or a film having flexibility and exhibits a transmitting property with respect to visible light.

An image-displaying portion 122 is provided over the base film 102 in display region 120. As described below, a plurality of pixels is disposed in the image-displaying portion 122. A driver circuit and the like for driving the pixels may be arranged in the display region 120, and an image is reproduced on the image-displaying portion 122 by the plurality of pixels.

A touch portion 142 is provided over the base film 102 in the touch region 140. The touch portion 142 is the same or substantially the same in size and shape as the image-displaying portion 122 and overlaps with the image-displaying region 122 (FIG. 1A). As described below, the touch portion 142 has a function to sense a touch by making contact with an object such as a finger or a palm (hereinafter, referred to as a touch) and determine its position and serves as an interface for inputting information by a user. A capacitive sensor mode, a film-resistance mode, an electromagnetic induction mode and the like can be adopted for the touch portion 142. As shown in FIG. 1A, a user recognizes the image-displaying portion 122 via the touch portion 142.

As described above, the base film 102 in the display region 120 and the base film 102 in the touch region 140 are connected in the boundary region 160. In other words, the base film 102 in the boundary region 160, the base film 102 in the display region 120, and the base film 102 in the touch region 140 are integrated, and the base film 102 in the display region 120 extends from under the image-displaying portion 122 to under the touch portion 142 in the touch region 140 through the boundary region 160. Therefore, the base film 120 has a continuous structure in the display region 120, the boundary region 160, and the touch region 140, and the image-displaying portion 122 is enclosed by the base film 102. Additionally, a part of the base film 102, that is, the base film 102 in the touch region 140 is sandwiched by the image-displaying portion 122 and the touch portion 142.

The display region 120 further has a plurality of first terminals 124 and a plurality of second terminals 126 over the base film 102 (FIG. 1A, FIG. 1B, and FIG. 2). At least a part of each of the plurality of first terminals 124 and second terminals 126 is provided so as not to overlap with the base film 102 in the touch region 140. That is, at least a part of each of the plurality of first terminals 124 and second terminals 126 is exposed from the base film 102 in the touch region 140.

The first terminals 124 and the second terminals 126 are arranged substantially parallel to a side (first side) 128 of the image-displaying portion 122 at a vicinity of the first side 128. The first terminals 124 are electrically connected to the image-displaying portion 122 through wirings 130 disposed over the base film 102. On the other hand, the second terminals 126 are electrically connected to the touch portion 142 through wirings 132 provided over the base film 102 in the display region 120. FIG. 1A is illustrated so that the plurality of second terminals 126 sandwich the plurality of first terminals 124. However, all of the plurality of second terminals 126 may be collectively provided at one place.

As shown in FIG. 1B, the first terminals 124 and the second terminals 126 are connected to a connector 170 such as a flexible printed circuit substrate (FPC), and signals are input to the image-displaying portion 122 and the touch portion 142 from an external circuit through the connector 170, the first terminals 124, and the second terminals 126. For instance, image signals and a power source are supplied to the first terminals 124, and detection signals for detecting a touch are supplied to the second terminals 126.

As described above, the first terminals 124 and the second terminals 126 are each provided over the base film 102 in the display region 120 and arranged parallel to the first side 128 at a vicinity of the first side 128. Thus, the first terminals 124 and the second terminals 126 can be connected to the single connector 170. Accordingly, compared with a case where the first terminals 124 and the second terminals 126 are individually connected to different connectors, the number of the connectors can be reduced by half, which allows manufacturing costs to be reduced and manufacturing process to be simplified.

The display region 120 and the touch region 140 may be adhered to each other. As illustratively shown in FIG. 2, the display region 120 and the touch region 140 may be adhered to each other through adhesion layers 182 and 184. In this case, a thickness of the display device 100 may be adjusted by placing a transparent substrate 180 as an optional structure between the display region 120 and the touch region 140. In this case, the transparent substrate 180 is adhered to the image-displaying portion 122 and the base film 102 in the touch region 140. It is preferred that the transparent substrate 180 have a transmitting property with respect to visible light. The transparent substrate 180 may possess flexibility. Note that a tip of an end portion of the transparent substrate 180 close to the boundary region 160 may be filleted so as to have a round shape in order to avoid damage to the base film 102 in the boundary region 160 by the transparent substrate 180.

2. Touch Portion

Figure 3:
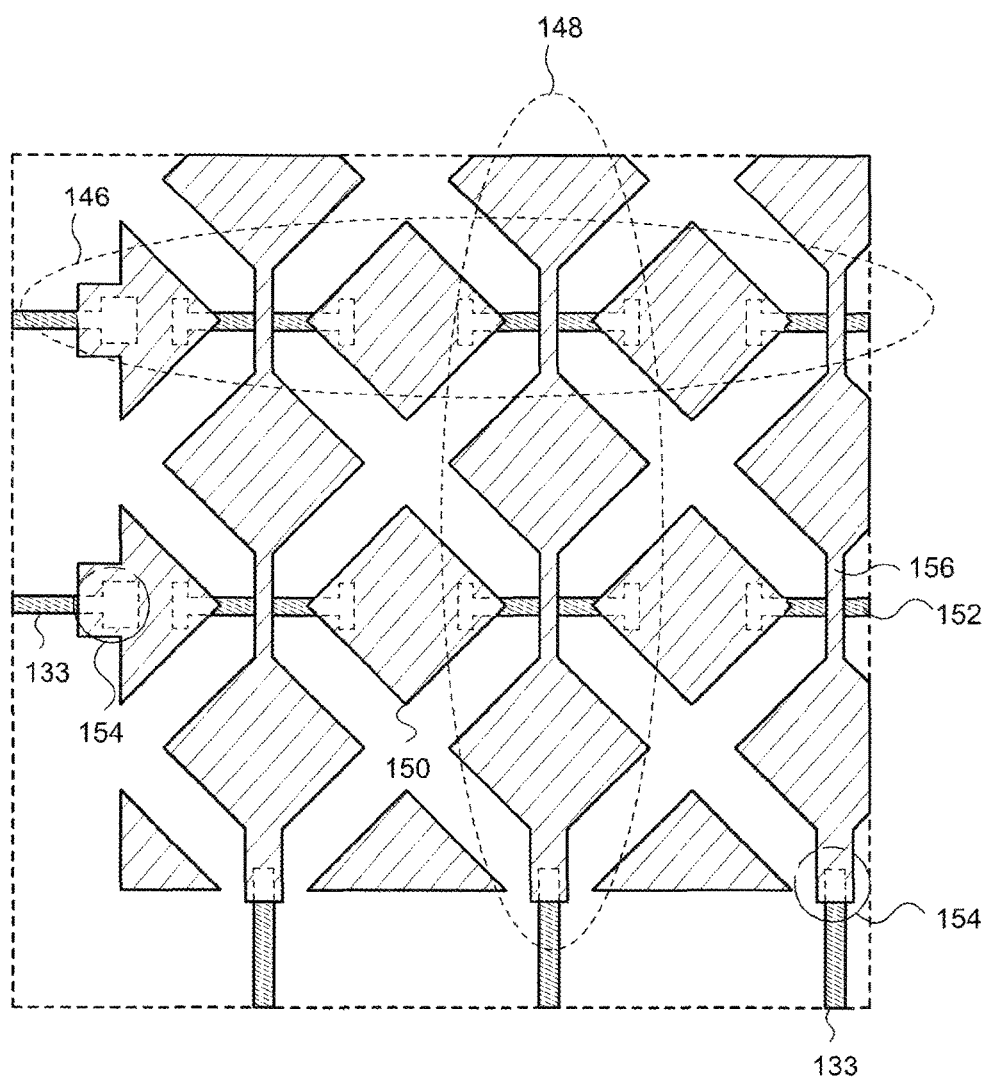
FIG. 3 is a schematic top view of a touch portion of a display device according to an embodiment of the present invention.

FIG. 3 schematically illustrates an enlarged view of a partial region 144 of the touch portion 142 (see, FIG. 1A). The touch portion 142 can detect a touch with a variety of modes, and explanation is given by using a touch portion of a capacitive sensor mode as an example.

The touch portion 142 has a structure in which a plurality of wirings is arranged in a lattice form. Specifically, the touch portion 142 possesses a plurality of wirings (Tx wirings 146) extending in a first direction (e.g., a direction parallel to the first side 128. See, FIG. 1A.) and a plurality of wirings (Rx wirings 148) perpendicularly intersecting with the Tx wirings 146. Each wiring includes a plurality of substantially square electrodes 150. For example, in each of the Tx wirings 146, the plurality of electrodes 150 is arranged in the first direction, and adjacent electrodes 150 are electrically connected to each other with a Tx bridge electrode (connection electrode) 152. In FIG. 3, an example is shown in which the electrodes 150 are formed over the Tx bridge electrodes 152. Wiring connection portions 154 are provided to the terminal electrodes (the leftmost electrodes in FIG. 3) of the Tx wirings 146. Wirings 133 are electrically connected to the Tx wirings 146 at these wiring connection portions 154. The Rx wirings 148 each have a structure in which the plurality of electrodes 150 and Rx bridge portions 156 connecting the electrodes 150 to each other are integrally formed as one unit. The wiring connection portions 154 are provided to the terminal electrodes (the bottom end electrodes in FIG. 3) of the Rx wirings 148. Similar to the Tx wirings 146, the wirings 133 are electrically connected to the Rx wirings 148 at the wiring connection portions 154 of the Rx wirings 148.

The electrodes 150 and Rx bridge portions 156 are each formed with a conductor transmitting visible light, such as a conductive oxide. On the other hand, it is not always necessary that the Tx bridge electrodes 152 transmit visible light, and the Tx bridge electrodes 152 may be formed with a metal which does not transmit visible light in addition to a conductive oxide transmitting visible light.

3. Developed Structure

Figure 4:
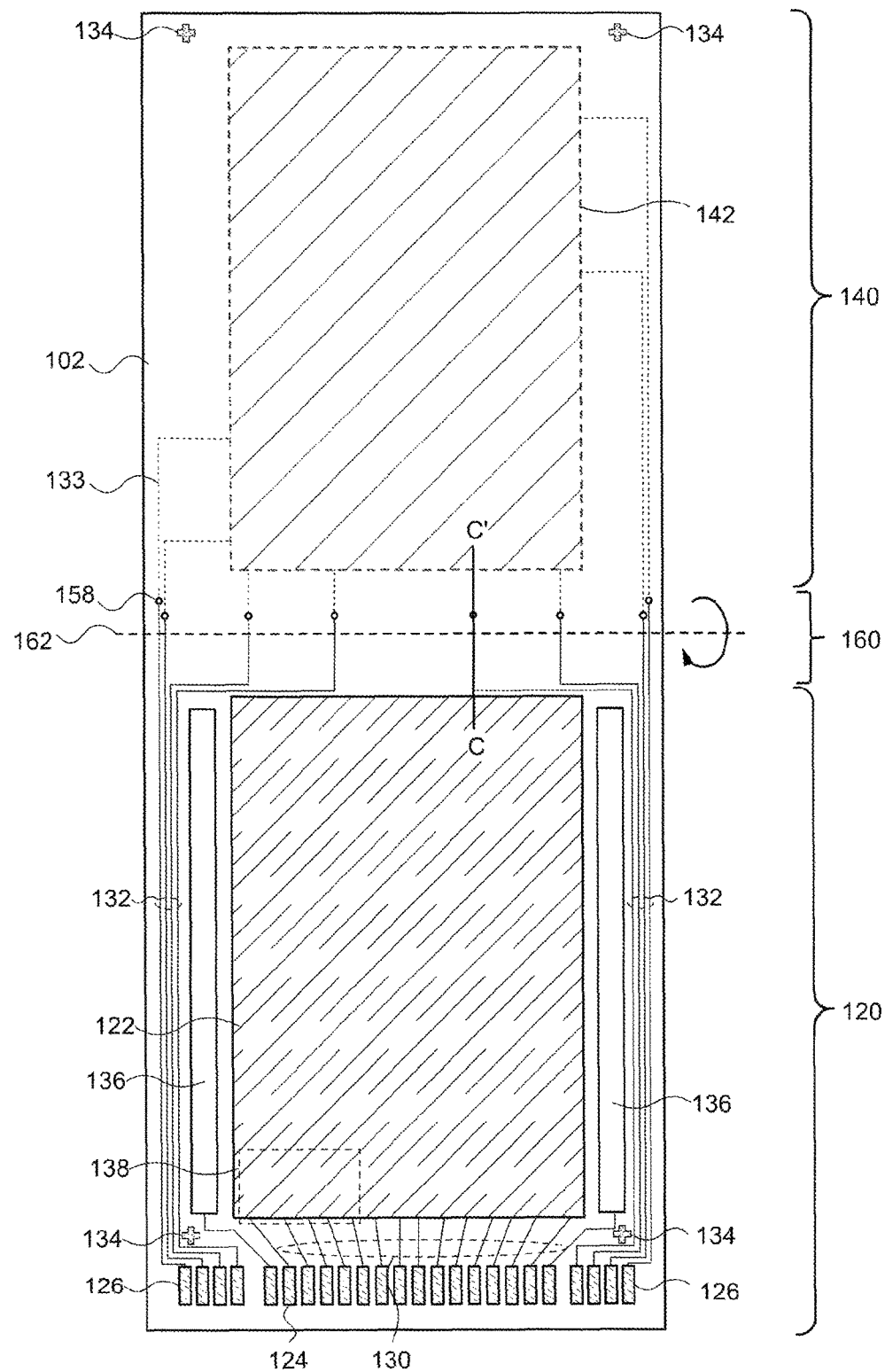
FIG. 4 is a schematic developed view of a display device according to an embodiment of the present invention.

A state in which the display device 100 is developed is shown in FIG. 4 in order to explain the structure of the display device 100 in more detail. FIG. 4 shows a state where the transparent substrate 180 and the adhesion layers 182 and 184 are removed from the display device 100 shown in FIG. 2 and the boundary region 160 is straightened.

As shown in FIG. 4, the base film 102 has the display region 120, the touch region 140, and the boundary region 160 between the display region 120 and the touch region 140. The touch portion 142 is provided under the base film 102 in the touch region 140. On the contrary, the image-displaying portion 122 is disposed over the base film 102 in the display region 120. Therefore, the image-displaying portion 122 is provided on one face (first face) of the base film 102, while the touch portion 142 is provided on the other face (second face opposing the first face) of the base film 102. In the display device 100 shown in FIG. 4, driver circuits 136 are disposed in the display region 120 so as to sandwich the image-displaying portion 122. However, the driver circuits 136 are an optional structure, and the display device 100 may be equipped with a driver circuit formed over a different substrate. In such a case, the driver circuit may be mounted over the wirings 130 or the connector 170.

The wirings 132 are connected to the second terminals 126, pass through regions beside the image-displaying portion 122 (frame), and extend from the display region 120 to the touch region 140 through the boundary region 160. The wirings 132 are further electrically connected to the wirings 133 disposed on a lower surface of the base film 102 in opening portions 158 formed in the base film 102 in the touch region 140. As described above, the wirings 133 are connected to the Tx wirings 146 and the Rx wirings 148 of the touch portion 142. Therefore, the touch portion 142 is electrically connected to the second terminals 126 via the wirings 133 and 132. On the other hand, the wirings 130 electrically connect the first terminals 124 to the image-displaying portion 122. Although not shown, in the boundary region 160, the wirings 132 and 133 may be arranged so as to extend in a direction inclined from each side of the image-displaying portion 122 and the touch portion 142.

Alignment markers 134 may be formed over the base film 102. The display device 100 shown in FIG. 1A, FIG. 1B, and FIG. 2 can be obtained by folding the boundary region 160 about an axis 162 so that the alignment markers 134 overlap with each other, followed by adhering the display region 120 to the touch region 140.

4. Image-Displaying Portion

Figure 5:
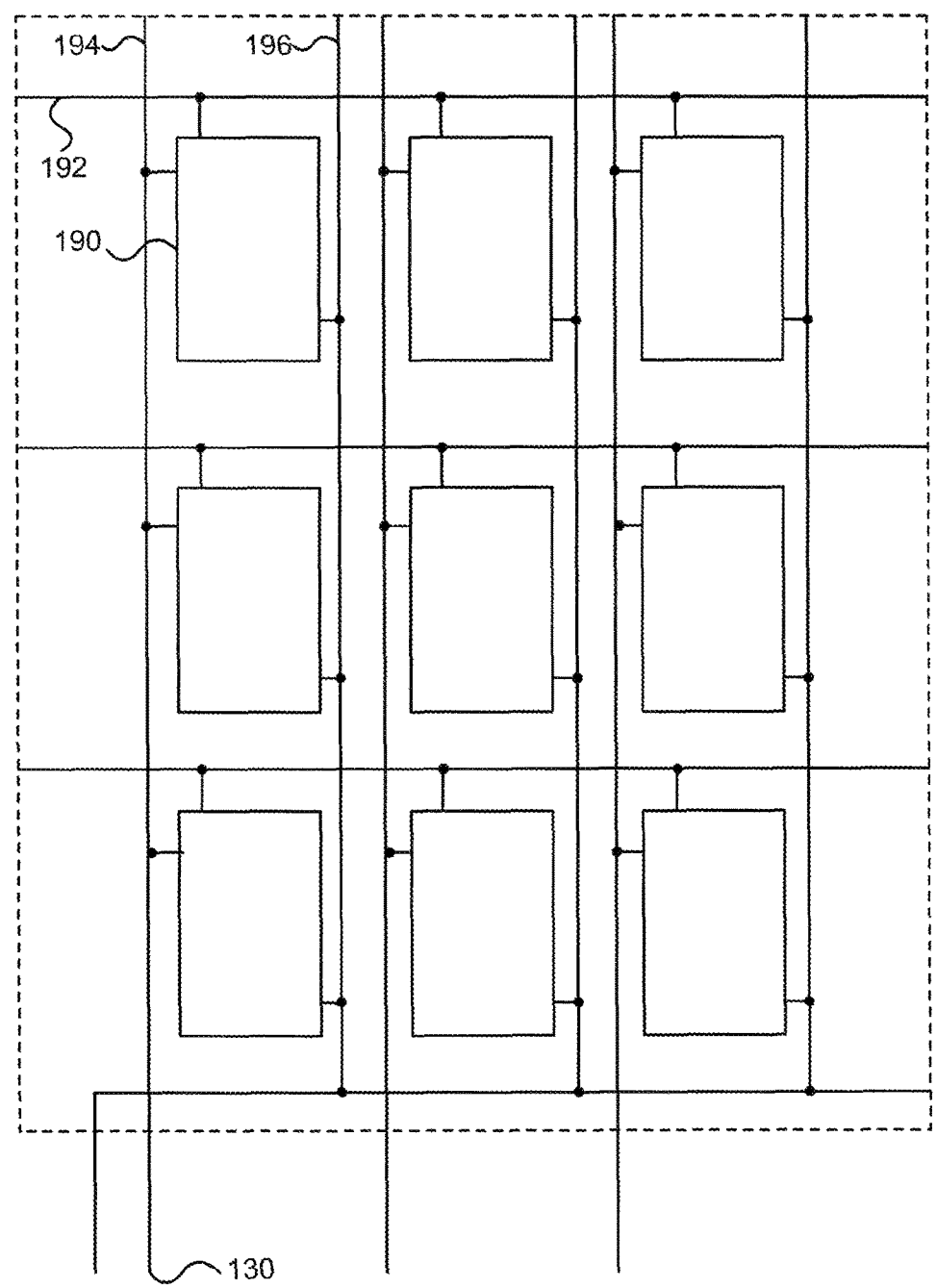
FIG. 5 a schematic top view of a display panel of a display device according to an embodiment of the present invention.

FIG. 5 schematically shows an enlarged view of a partial region 138 of the image-displaying portion 122 (see, FIG. 4). The image-displaying portion 122 possesses a plurality of pixels 190. A display element such as a light-emitting element and a liquid crystal element can be disposed in the plurality of pixels 190. For example, the adjacent pixels 190 are configured to provide a red color, a green color, or a blue color, thereby achieving full color display. There is no limitation to an arrangement of the pixels 190, and a stripe arrangement, a delta arrangement, a PenTile arrangement, and the like can be employed. The PenTile arrangement is an arrangement which is effective in improving resolution in appearance with a smaller number of pixels than that of the stripe arrangement or the delta arrangement. For example, a part of the RGB pixels is arranged in a matrix with row and column directions, and the other part is arranged so as to be mutually staggered in an inclined direction with respect to the part of the RGB pixels. The PenTile arrangement is characterized in that the number of sub-pixels is different between the RGB pixels.

One or a plurality of transistors is provided in each pixel 190, and a plurality of signal lines 192, 194, and 196 supplying signals to each transistor is arranged in a lattice form. For example, the signal lines 194, 192, and 196 are capable of respectively supplying an image signal, a scanning signal, and a high-potential power-source voltage to each pixel 190. Although not shown, the image-displaying portion 122 may have wiring other than the aforementioned signal lines. These signal lines are connected to the first terminals 124 through the driver circuits 136 or the wirings 130.

5. Cross-Sectional Structure 5.1 Display Region

Figure 6:
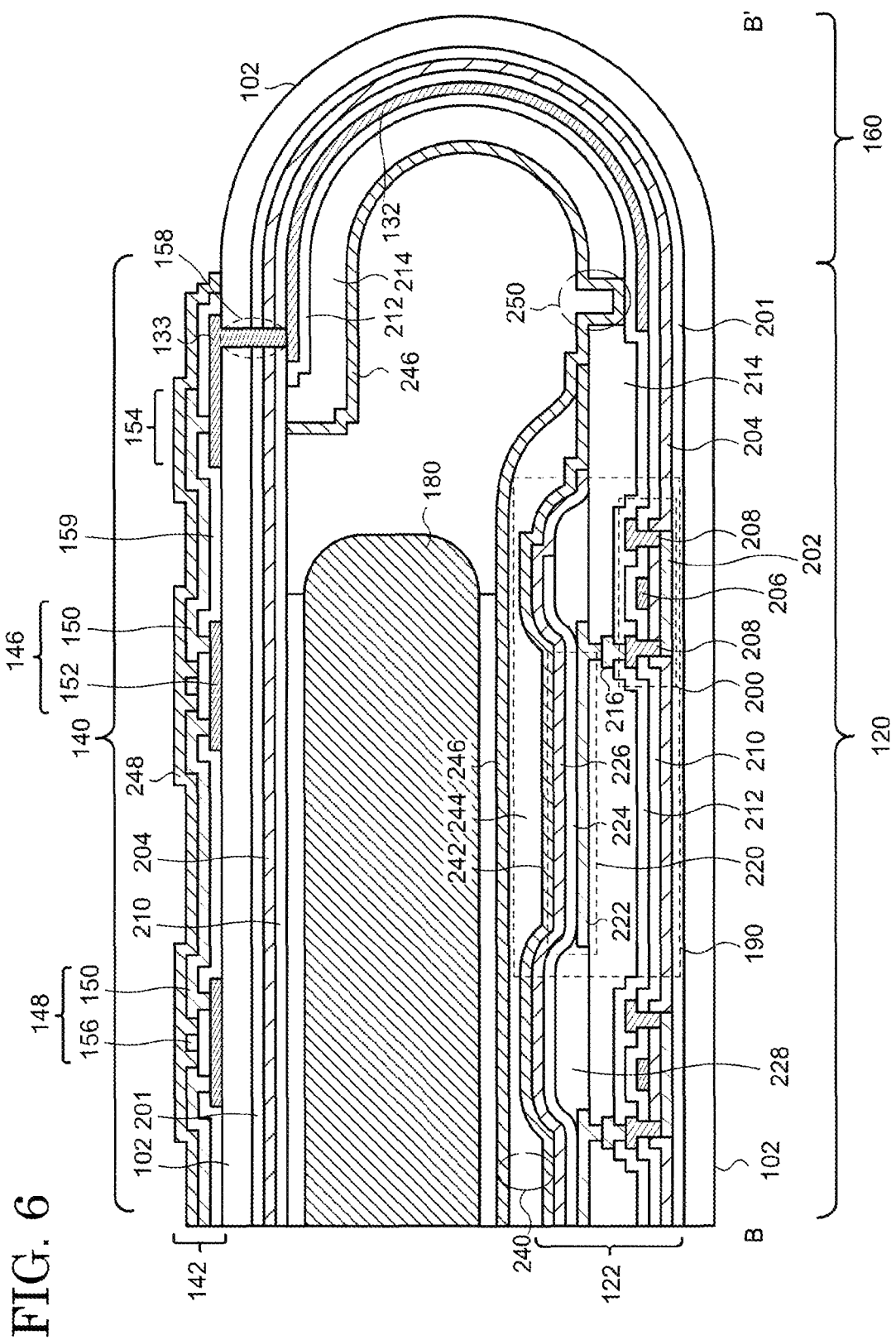
FIG. 6 is a schematic cross-sectional view of a display device according to an embodiment of the present invention.

A cross-sectional structure of the display device 100 is explained in detail by using FIG. 6. FIG. 6 is a schematic view of a cross section along a chain line B-B' of FIG. 1A.

The image-displaying portion 122 is arranged over the base film 102 in the display region 120, and each pixel 190 of the image-displaying portion 122 may include a transistor 200 and a light-emitting element 220 connected to the transistor 200. Although an example is shown in FIG. 6 in which one transistor is formed in each pixel 190, each transistor 190 may have a plurality of transistors. Additionally, each transistor 190 may include a semiconductor element other than a transistor, such as a capacitor element. An undercoat 201 may be formed as an optional structure between the base film 102 and the transistor 200.

The transistor 200 possesses a semiconductor film 202, a gate insulating film 204, a gate electrode 206, and a pair of source/drain electrodes 208. A first interlayer film 210 can be provided over the gate electrode 206, and the source/drain electrodes 208 are connected to the semiconductor film 202 through an opening portion formed in the gate insulating film 204 and the first interlayer film 210.

FIG. 6 is illustrated so that the transistor 200 has a top-gate top-contact type structure. However, there is no limitation to the structure of the transistor 200, and the transistor 200 may have a bottom-gate type or a top-gate type structure. An up-and-down relationship with respect to the semiconductor film 202 and the source/drain electrodes 208 is also not limited. Moreover, a so-called multi-gate structure in which a plurality of gate electrodes 206 is provided may be employed in the transistor 200.

A second interlayer film 212 may be disposed over the transistor 200, and a leveling film 214 absorbing depressions and projections caused by the transistor 200 and the like providing a flat surface may be further formed thereover.

The light-emitting element 220 has a first electrode 222, a second electrode 226, and an EL layer 224 provided between the first electrode 222 and the second electrode 226. The first electrode 222 is electrically connected to one of the source-drain electrodes 208 through a connection electrode 216. The first electrode 222 may include a conductive oxide having a light-transmitting property, a metal, or the like. When the light obtained from the light-emitting element 220 is extracted through the touch region 140, a metal such as aluminum and silver or an alloy thereof can be used for the first electrode 222. In this case, a stacked-layer structure of the aforementioned metal or alloy with the conductive oxide having a light-transmitting property, such as a stacked-layer structure with a metal sandwiched by a conductive oxide (indium-tin-oxide (ITO)/silver/ITO), may be utilized.

A partition wall 228 covering an edge portion of the first electrode 222 may be further provided in the image-displaying portion 122. The partition wall 228 is also called a bank (rib). The partition wall 228 possesses an opening portion to expose a part of the first electrode 222, and an edge of the opening portion is preferred to have a moderately tapered shape. A steep edge of the opening portion readily causes a coverage defect of the EL layer 224, the second electrode 226, and the like.

The EL layer 224 is formed so as to cover the first electrode 222 and the partition wall 228. Note that, in the present specification, the EL layer 224 means all the layers sandwiched by a pair of electrodes (here, first electrode 222 and the second electrode 226).

For the second electrode 226, it is possible to use a film containing a conductive oxide with a light-transmitting property, such as ITO and indium-zinc-oxide (IZO), or a metal, which is formed at a thickness allowing light to pass therethrough and includes silver, magnesium, aluminum, or the like. With this structure, the emitted light obtained in the EL layer 224 can be extracted through the touch region 140.

The image-displaying portion 122 may further possess a passivation film 240 over the light-emitting element 220. The passivation film 240 has a function to prevent moisture from entering the light-emitting element 220 from outside and is preferred to have a high gas-barrier property. The passivation film 240 shown in FIG. 6 has a three-layer structure and has a first layer 242 and a third layer 246 including an inorganic material and a second layer 244 sandwiched therebetween and including an organic resin.

Note that the leveling film 214 may have, as an optional structure, an opening portion 250 reaching the second interlayer film 212 between the pixel 190 closest to the boundary region 160 and the boundary region 160. Moreover, the passivation film 240 may be formed so that the second interlayer 212 is in contact with the third layer 246 in the opening portion 250. Introduction of such a structure prevents impurities from diffusing in the leveling film 214 and entering the light-emitting element 220 from the boundary region 160.

5.2 Touch Region

The touch region 140 possesses the undercoat 201, the gate insulating film 204, and the first interlayer film 210, which extend through the boundary region 160 from the display region 120, under the base film 102 and the touch portion 142 over the base film 102. As described above, the touch portion 142 has the Tx wiring 146 including the electrodes 150 and the Tx bridge electrodes 152 and the Rx wiring 148 including the electrodes 150 and the Rx bridge portions 156. The opening portion 158 is formed in the base film 102. The wiring 132 extends to under the base film 102 in the touch region 140 from the display region 120 through the boundary region 160. The wiring 132 and the wiring 133 are arranged so as to sandwich the base film 102 and are electrically connected to each other via the opening portion 158. The wiring 133 is electrically connected to the Tx wiring 146 in the wiring connection portion 154. Note that, although FIG. 6 is illustrated so that the opening portion 158 is provided in the undercoat 201, the gate insulating film 204, and the first interlayer film 210, it is not always necessary to provide the undercoat 201, the gate insulating film 204, and the first interlayer film 210 in the touch region 140.

An insulating film 159 is disposed between the Tx wiring 146 and the Rx wiring 148, and a capacitance is formed by the Tx wiring 146, the Rx wiring 148, and the insulating film 159. A protection film 248 is formed over the Tx wiring 146, the Rx wiring 148, and the insulating film 159. A touch of a finger or palm to the touch region 140 through the protection film 248 generates a capacitive coupling. As a result, a capacitance is varied at the touched position, allowing the touched position to be detected.

5.3 Boundary Region

The base film 102 is folded in the boundary region 160. In the boundary region 160, the undercoat 201, the gate insulating film 204, the first interlayer film 210, the second interlayer film 212, the leveling film 214, and the third layer 246, which extend from the display region 120, are provided to the base film 102, and these films further extend to the touch region 140. In the boundary region 160, the wiring 132 existing in the same layer as the source/drain electrodes 208 is provided between the first interlayer film 210 and the second interlayer film 212.

Note that all of the undercoat 201, the gate insulating film 204, the first interlayer film 210, the second interlayer film 212, the leveling film 214, and the third layer 246 are not necessarily included in the boundary region 160. It is preferred that at least one of the second interlayer film 212, the leveling film 214, and the third layer 246 be formed over the wiring 132 in order to avoid deterioration of the wiring 132.

The display device 100 has the transparent substrate 180 as an optional structure, and the transparent substrate 180 overlaps with and is sandwiched between the display region 120 and the touch region 140. The transparent substrate 180 is adhered to the image-displaying portion 122 with the adhesion layer 182 and adhered to the base film 102 in the touch region 140 or one of the undercoat 201, the gate insulating film 204, and the first interlayer film 210 formed thereunder with the adhesion layer 184. The transparent substrate 180 may possess flexibility or have low flexibility similar to a glass substrate. The use of the transparent substrate 180 with low flexibility enables fixation of the shape of the display device 100.

Although described in detail in the Second Embodiment, the image-displaying portion 122 and the touch portion 142 of the display device 100 can be formed on the same base film 102. Therefore, it is not necessary to independently fabricate the image-displaying portion 122 and the touch portion 142. Additionally, as shown in FIG. 1B, it is possible to use a single connector for the first terminals 124 and the second terminals 126, thereby supplying signals to the image-displaying portion 122 and the touch portion 142 from an external circuit. Accordingly, it is not necessary to independently connect connectors to the first terminals 124 and the second terminals 126. Hence, the structure and the manufacturing process of the display device 100 can be simplified, allowing production of the display device 100 equipped with the touch portion 142 at a low cost. Furthermore, the flexible display device 100 equipped with the touch portion 142 can be supplied by using the transparent substrate 180 having flexibility.

Second Embodiment

In the present embodiment, a manufacturing method of the display device 100 is explained by using FIG. 7A to FIG. 19. Explanation of the contents which are the same as those described in the First Embodiment may be omitted. FIG. 7A to FIG. 19 are schematic cross-sectional views along a chain line C-C' of FIG. 4.

Figure 7A:
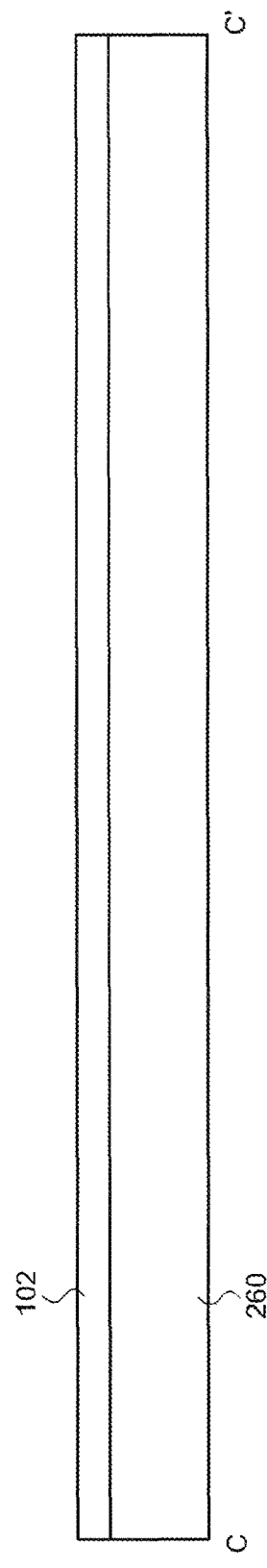
FIG. 7A and FIG. 7B are schematic cross-sectional views showing a manufacturing method of a display device according to an embodiment of the present invention.

First, as shown in FIG. 7A, the base film 102 is formed over a first supporting substrate 260. The first supporting substrate 260 has a function to support the semiconductor elements included in the image-displaying portion 122, such as the transistor 200 and the light-emitting element 220. Therefore, a material which has heat resistance to a process temperature of a variety of elements formed thereover and chemical stability to chemicals used in the process may be used. Specifically, the first supporting substrate 260 may include glass, quartz, plastics, a metal, ceramics, and the like.

The base film 102 is an insulating film with flexibility and can include a material selected from a polymer material exemplified by a polyimide, a polyamide, a polyester and a polycarbonate. The base film 102 can be formed by applying a wet-type film-forming method such as a printing method, an ink-jet method, a spin-coating method and a dip-coating method or a lamination method, for example.

Figure 7B:
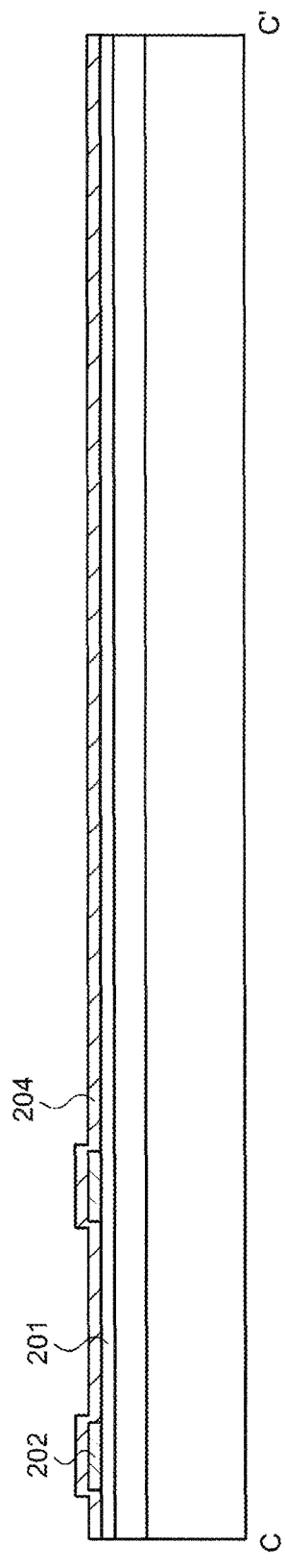

Next, as shown in FIG. 7B, the undercoat 201 is formed over the base film 102. The undercoat 201 is a film having a function to prevent impurities such as an alkaline metal from diffusing to the transistor 200 and the like from the first supporting substrate 260 and the base film 102 and may include an inorganic insulator such as silicon nitride, silicon oxide, silicon nitride oxide and silicon oxynitride. The undercoat 201 can be formed by applying a chemical vapor deposition method (CVD method), a sputtering method, or the like so as to have a single-layer or stacked-layer structure. Note that, when an impurity concentration in the base film 102 is low, the undercoat 201 may not be provided or may be formed to cover a part of the base film 102.

Next, the semiconductor film 202 is formed. The semiconductor film 202 can include a Group 14 element such as silicon, for example. Alternatively, the semiconductor film 202 may contain an oxide semiconductor. The semiconductor film 202 may include a Group 13 element such as indium and gallium as an oxide semiconductor, and a mixed oxide of indium and gallium (IGO) is represented, for example. When an oxide semiconductor is used, the semiconductor film 202 may further include a Group 12 element, and a mixed oxide containing indium, gallium, and zinc (IGZO) is exemplified. Crystallinity of the semiconductor film 202 is not limited, and the semiconductor film 202 may be single crystalline, polycrystalline, microcrystalline, or amorphous.

When the semiconductor film 202 includes silicon, the semiconductor film 202 may be formed with a CVD method by using silane gas and the like as a raw material. Crystallization may be conducted by performing a heating treatment or irradiation of light such as a laser on the resulting semiconductor film 202. When the semiconductor film 202 includes an oxide semiconductor, the semiconductor film 202 can be formed by utilizing a sputtering method and the like.

Next, the gate insulating film 204 is formed so as to cover the semiconductor film 202. The gate insulating film 204 may possess a single-layer structure or a stacked-layer structure and may be formed with the same method as that for the undercoat 201.

Figure 8A:
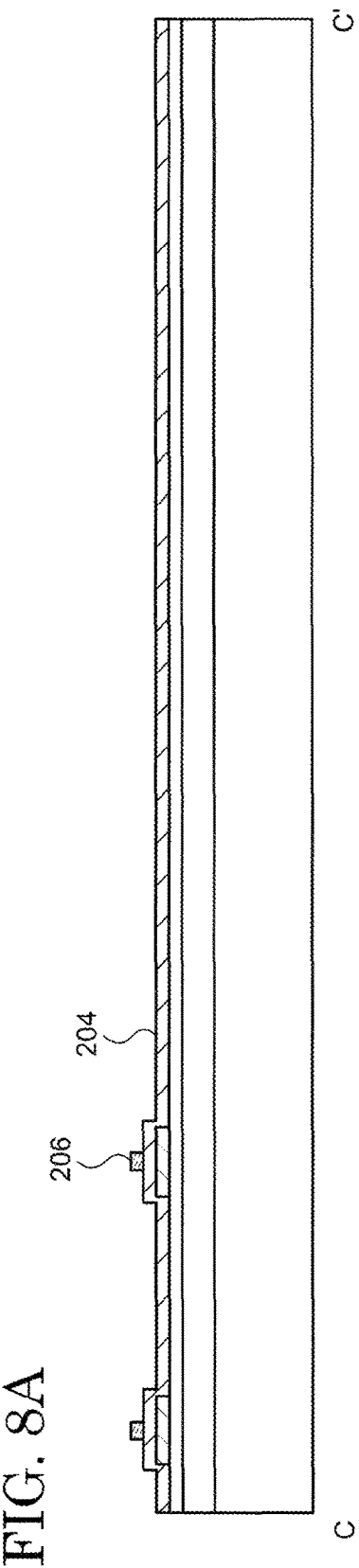
FIG. 8A and FIG. 8B are schematic cross-sectional views showing a manufacturing method of a display device according to an embodiment of the present invention.

Next, the gate electrode 206 is formed over the gate insulating film 204 with a sputtering method or a CVD method (FIG. 8A). The gate electrode 206 may be formed so as to have a single-layer or stacked-layer structure by using a metal such as titanium, aluminum, copper, molybdenum, tungsten and tantalum or an alloy thereof. For example, a structure may be employed in which a highly conductive metal such as aluminum and copper is sandwiched by a metal with a relatively high melting point, such as titanium, tungsten and molybdenum.

Figure 8B:
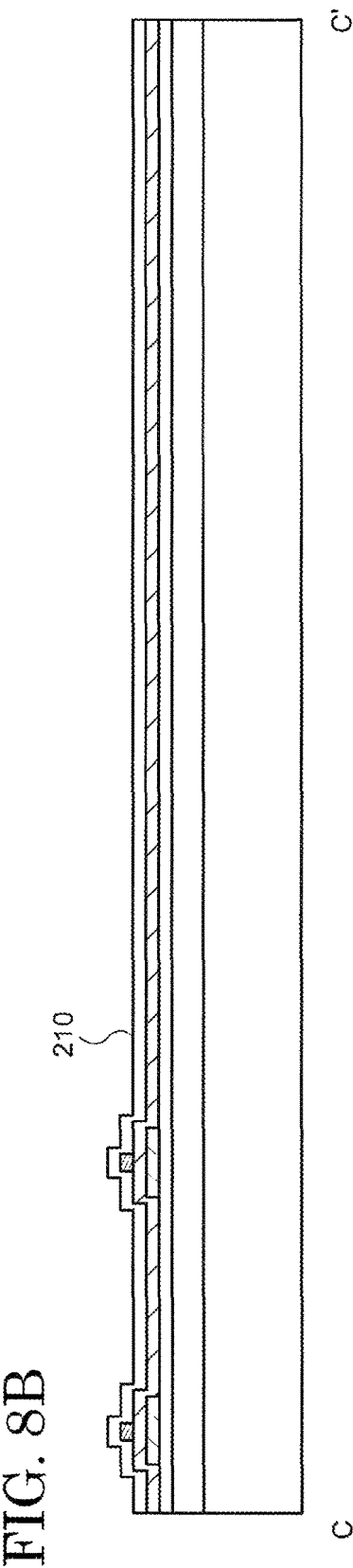

Next, the first interlayer film 210 is formed over the gate electrode 206 (FIG. 8B). The first interlayer film 210 may have a single-layer structure or a stacked-layer structure and can be formed with the same method as that for the undercoat 201.

Figure 9A:
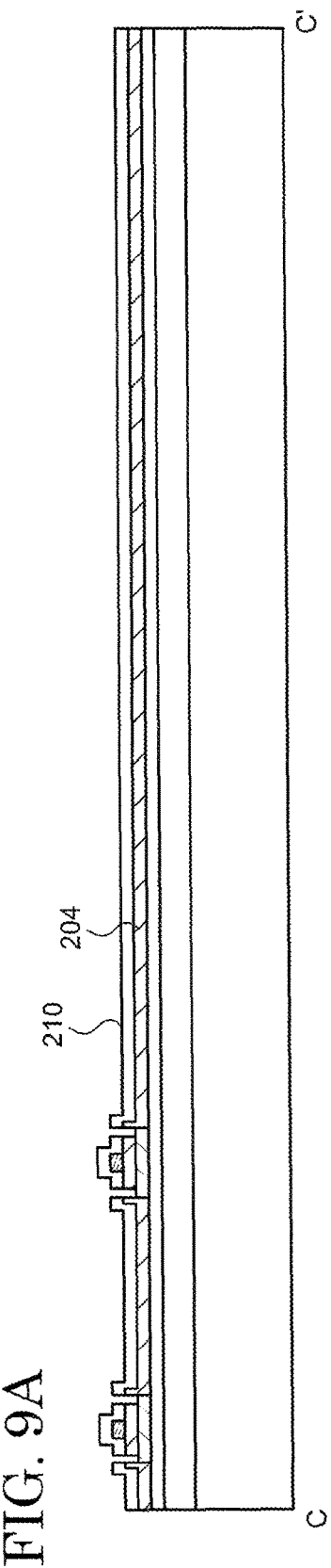
FIG. 9A and FIG. 9B are schematic cross-sectional views showing a manufacturing method of a display device according to an embodiment of the present invention.

Next, etching is performed on the first interlayer film 210 and the gate insulating film 204 to form the opening portions reaching the semiconductor film 202 (FIG. 9A). The opening portions may be formed by performing plasma etching in a gas including a fluorine-containing hydrocarbon, for example.

Figure 9B:
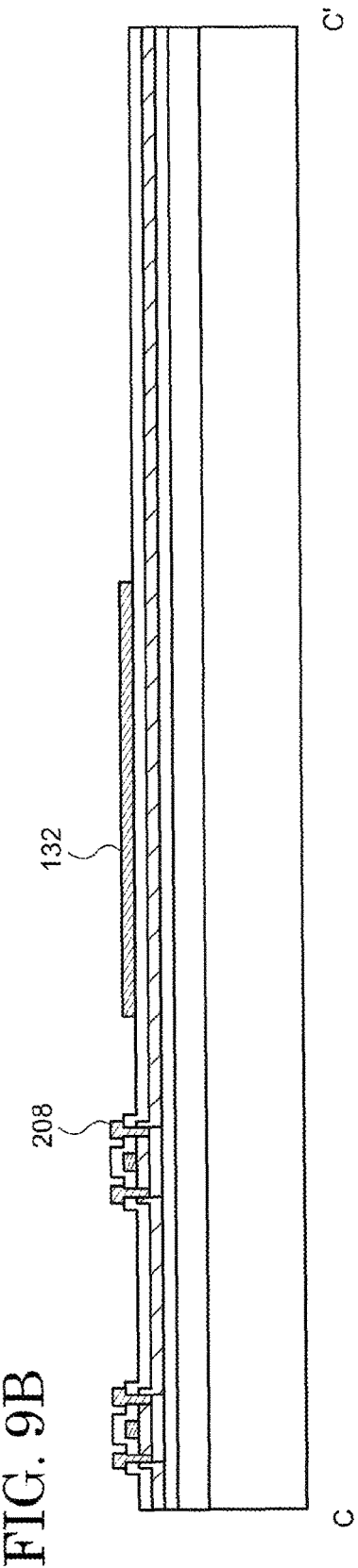

Next, a metal film is formed to cover the opening portions and then processed by etching, thereby forming the wiring 132 simultaneously with the source/drain electrodes 208 (FIG. 9B). Thus, the source/drain electrodes 208 and the wiring 132 exist in the same layer in the display device 100. The metal film may have the same structure as that of the gate electrode 206 and may be formed with a method which is the same as that for the gate electrode 206. Although not shown, the wiring 132 may be formed at the same time when the gate electrode 206 is formed.

Next, the second interlayer film 212 is formed over the source/drain electrodes 208 and the wiring 132 as shown in FIG. 10A. The formation of the second interlayer film 212 can be performed in the same way as that of the undercoat 201. Furthermore, etching is conducted on the second interlayer film 212 to form an opening portion reaching the source/drain electrode 208. This opening portion can be also formed with dry etching such as the aforementioned plasma etching.

Next, a conductive film is formed to cover the opening portion and processed with etching to form the connection electrode 216 (FIG. 10B). The connection electrode 216 can be formed as a conductive film with a sputtering method and the like by using a conductor transmitting visible light, such as ITO and IZO. Alternatively, the connection electrode 216 may be formed with a sol-gel method by using a corresponding metal alkoxide.

Next, the leveling film 214 is formed so as to cover the connection electrode 216 (FIG. 11A). The leveling film 214 has a function to absorb depressions and projections caused by the semiconductor element such as the transistor 200 and to provide a flat surface. The leveling film 214 can be formed with an organic insulator. As an organic insulator, a polymer material such as an epoxy resin, an acrylic resin, a polyimide, a polyamide, a polyester, a polycarbonate and a polysiloxane is represented, and the leveling film 214 can be formed with the aforementioned wet-type film-formation method. The leveling film 214 may have a stacked-layer structure of a layer including the aforementioned organic insulator with a layer including an inorganic insulator. In such a case, a silicon-containing inorganic insulator such as silicon oxide, silicon nitride, silicon nitride oxide and silicon oxynitride can be represented as an inorganic insulator, and a film containing these materials can be formed with a sputtering method or a CVD method. Note that the leveling film 214 may be formed in the touch region 140 where the touch portion 142 is provided.

Next, etching is performed on the leveling film 214 to form an opening portion reaching the connection electrode 216 (FIG. 11A). After that, the first electrode 222 of the light-emitting element 220 is formed over the leveling film 214 with a sputtering method and the like (FIG. 11B).

Next, the partition wall 228 is formed so as to cover the edge portion of the first electrode 222 (FIG. 12A). Steps caused by the first electrode 222 are absorbed with the partition wall 228 and the first electrodes 222 of the adjacent pixels 190 are electrically insulated from each other. The partition wall 228 can be formed with a wet-type film-formation method by using a material usable for the leveling film 214, such as an epoxy resin and an acrylic resin.

Next, the EL layer 224 and the second electrode 226 of the light-emitting element 220 are formed so as to cover the first electrode 222 and the partition wall 228 (FIG. 12B). The EL layer 224 may be formed with a single layer or a plurality of layers. For example, the EL layer 224 can be formed by appropriately combining a carrier-injection layer, a carrier-transporting layer, an emission layer, a carrier-blocking layer, an exciton-blocking layer and the like. Additionally, the EL layer 224 may be different in structure between adjacent pixels 190. For instance, the EL layer 224 may be formed so that the emission layer is different but other layers are the same between the adjacent pixels 190. On the contrary, the same EL layer 224 may be employed in all of the pixels 190. In this case, the EL layer 224 giving white emission is formed so as to be shared by the adjacent pixels 190, and a color filter is used to select a wavelength of light extracted from each pixel 190, for example.

The second electrode 226 can be formed with a metal or a conductive oxide having a light-transmitting property by the same method as that of the first electrode 222.

Next, the passivation film 240 is formed. For example, as shown in FIG. 13A, the first layer 242 is first formed over the second electrode 226. The first layer 242 may contain an inorganic material exemplified by silicon nitride, silicon oxide, silicon nitride oxide and silicon oxynitride and can be formed with the same method as that of the undercoat 201. The first layer 242 may be selectively formed over the light-emitting element 220 as shown in FIG. 13A or may be formed in the boundary region 160 and the touch region 140.

Next, the second layer 244 is formed (FIG. 13A). The second layer 244 may include an organic resin including an acrylic resin, a polysiloxane, a polyimide, a polyester and the like. Furthermore, as shown in FIG. 13A, the second layer 244 may be formed so as to have a thickness by which depressions and projections caused by the partition wall 228 are absorbed and a flat surface is obtained. The second layer 224 may also be formed in the regions in which the boundary region 160 and the touch region 140 are formed. The second layer 224 can be formed with the aforementioned wet-type film-formation method or by atomizing or gasifying oligomers serving as a raw material of the aforementioned polymer material at a reduced pressure, spraying the first layer 244 with the oligomers and then polymerizing the oligomers.

Next, the opening portion 250 is formed in the leveling film 214 in the region between the pixel 190 of the display region 120 closest to the boundary region 160 and the boundary region 160 (FIG. 13B). The opening portion 250 may be formed with the aforementioned dry etching or the like, for example.

After that, the third layer 246 is formed (FIG. 14A). The third layer 246 may possess the same structure as that of the first layer 242 and can be formed with the same method as that of the first layer 242. The third layer 246 may be formed not only over the opening portion 250 provided over the leveling film 214 and the light-emitting element 220 but also in the boundary region 160 and the touch region 140. The third layer 246 is in contact with the second interlayer film 212 in the opening portion 250. This structure disconnects the leveling film 214 by which impurities are prevented from diffusing into the display region 120 from the boundary region 160 through the leveling film 214, thereby improving reliability of the light-emitting element 220. Moreover, the second layer 244 may be formed so as not to overflow outside the first layer 242, and the third layer 246 may be formed so as to be in contact with the first layer 242 in a periphery of the display region 120, by which the second layer 244 is interposed and sealed therebetween and does not make contact with the leveling film 214. This structure enables interruption of an entrance pathway of moisture because the leveling film 214 and the second layer 244 which are layers including an organic material do not provide a continuous structure.

After that, a second supporting substrate 262 is formed over the base film 102 with an adhesion layer 264 therebetween (FIG. 14B). The second supporting substrate 262 has a function to support the touch portion 142 formed later, and a material which is the same as that of the first supporting substrate 260 can be used. As the adhesion layer 264, a photocurable resin, a thermosetting resin and the like can be used.

After that, the first supporting substrate 260 is separated. For example, light such as a laser is applied from a side of the first supporting substrate 260 to decrease adhesion between the first supporting substrate 260 and the base film 102. Then, the first supporting substrate 260 is physically peeled off (FIG. 15A).

Next, etching is performed on the base film 102, the undercoat 201, the gate insulating film 204 and the first interlayer film 210 to form the opening portion 158 so that the wiring 132 is exposed (FIG. 15B). Note that FIG. 15B shows a state which is obtained by inverting the structure shown in FIG. 15A upside down.

Next, the Tx bridge electrodes 152 and the wiring 133 are formed over a face of the base film 102 opposite to a face over which the aforementioned transistor 200 and light-emitting element 220 are formed so that the opening portion 158 is filled (FIG. 16A), by which the wiring 132 and the wiring 133 are electrically connected to each other. These wirings may contain a metal included in the gate electrode 206 or the source/drain electrodes 208 and can be formed with the same method. Furthermore, the insulating film 159 is formed to cover the Tx bridge electrodes 152 and the wiring 133 (FIG. 16B). The insulating film 159 can be formed with the same method as that of the undercoat 201.

Figure 17A:
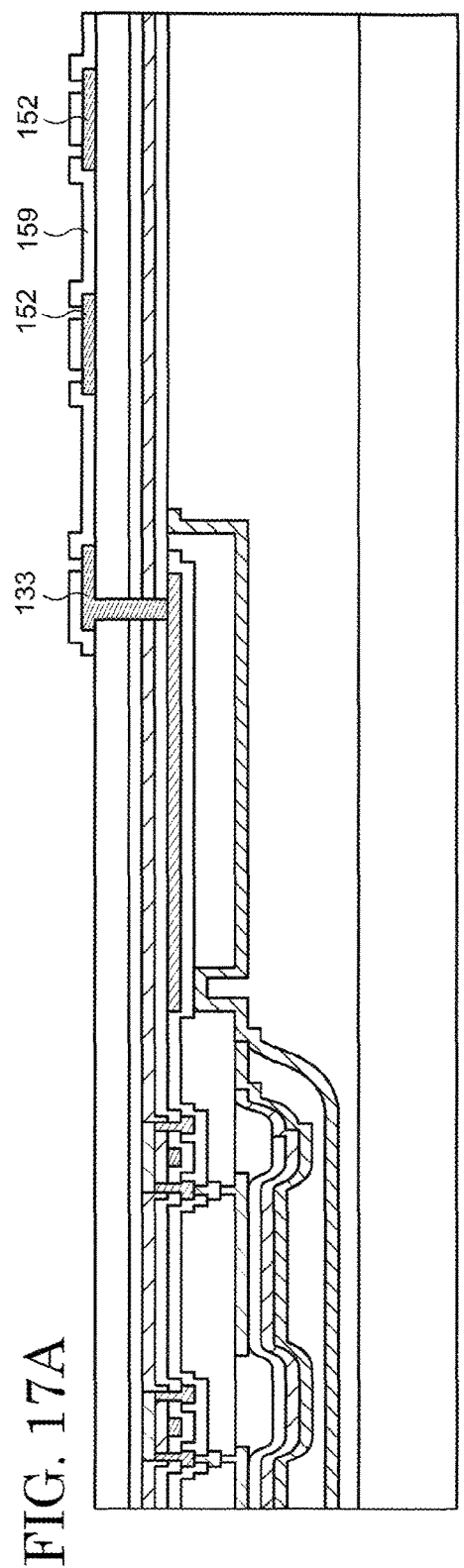
FIG. 17A and FIG. 17B are schematic cross-sectional views showing a manufacturing method of a display device according to an embodiment of the present invention.
Figure 17B:
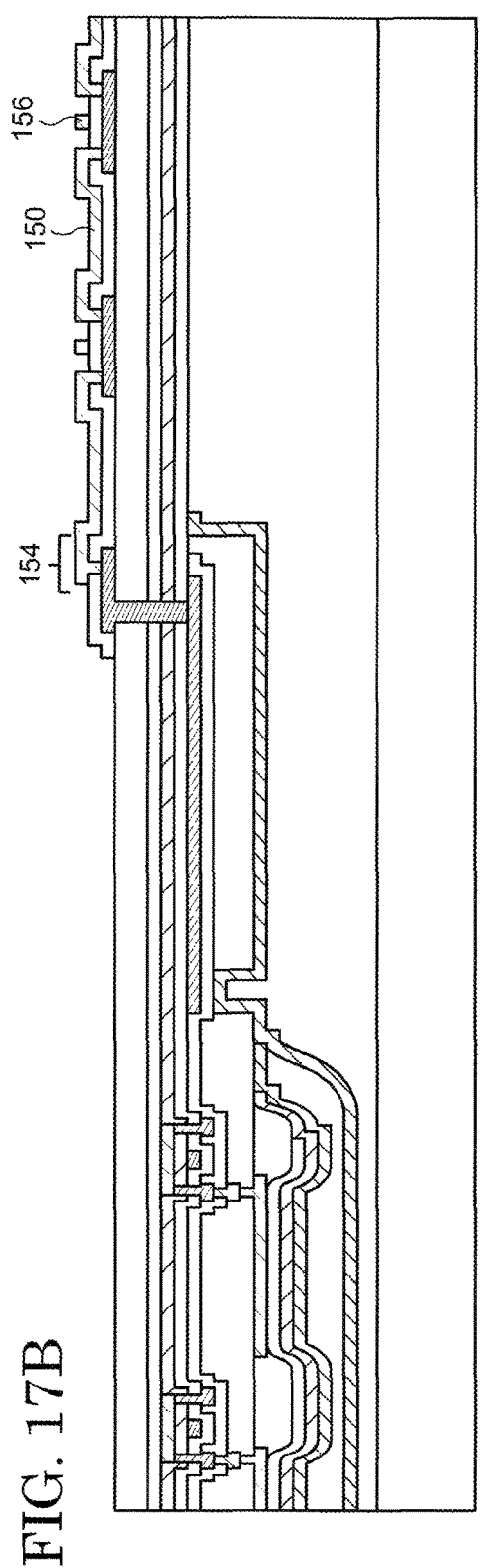

Next, etching is carried out on the insulating film 159 to form opening portions exposing the Tx bridge electrodes 152 and the wiring 133 (FIG. 17A). Additionally, the electrodes 150 and the Rx bridge portions 156 are formed to fill these opening portions (FIG. 17B). The electrodes 150 and the Rx bridge portions 156 may include a conductive oxide transmitting visible light, such as ITO and IZO, and can be formed with a sputtering method or the like.

Figure 18:
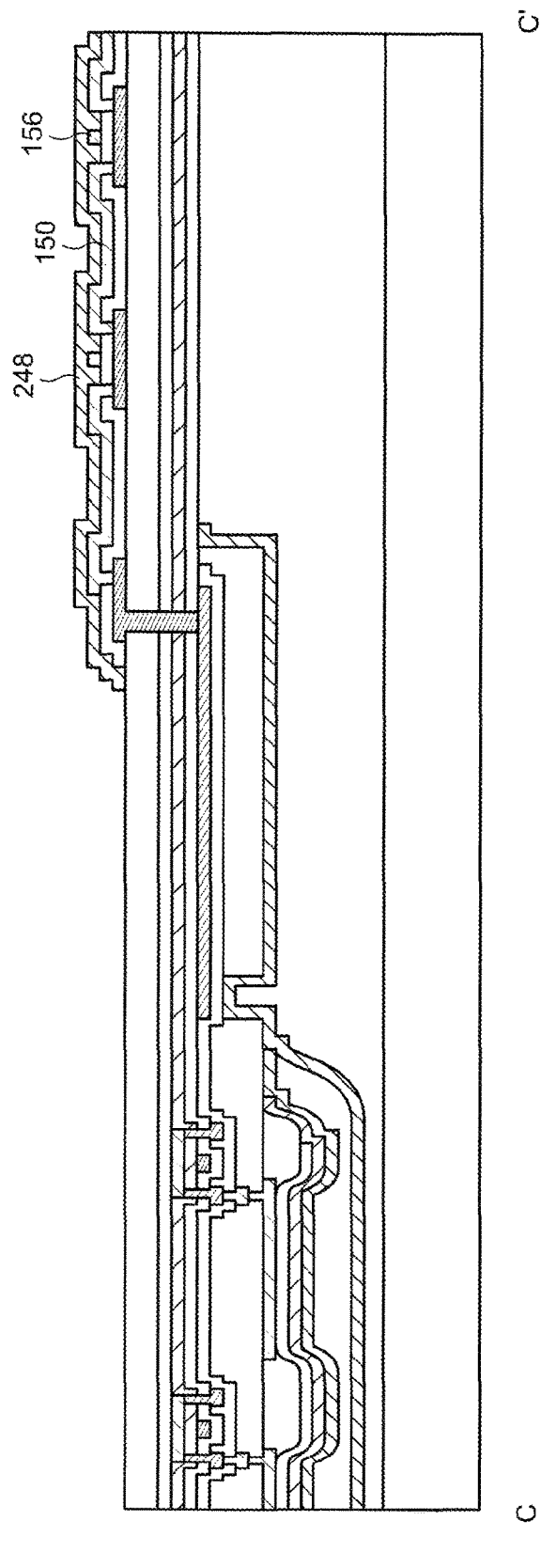
FIG. 18 is a schematic cross-sectional view showing a manufacturing method of a display device according to an embodiment of the present invention.

Next, the protection film 248 for protecting the touch portion 142 is formed (FIG. 18). The protection film 248 may possess a structure which is the same as that of the first layer 242 or the third layer 246 of the passivation film 240 and can be formed with the same method as that of the first layer 242 or the third layer 246. By the aforementioned processes, the touch portion 142 is fabricated. Here, in the present specification and the claims, one of the two main faces of the touch portion 142 opposing each other, which is closer to the base film, is called a lower face or a back face, and the other face which is further from the base film 102 is called an upper face or a front face.

Figure 19:
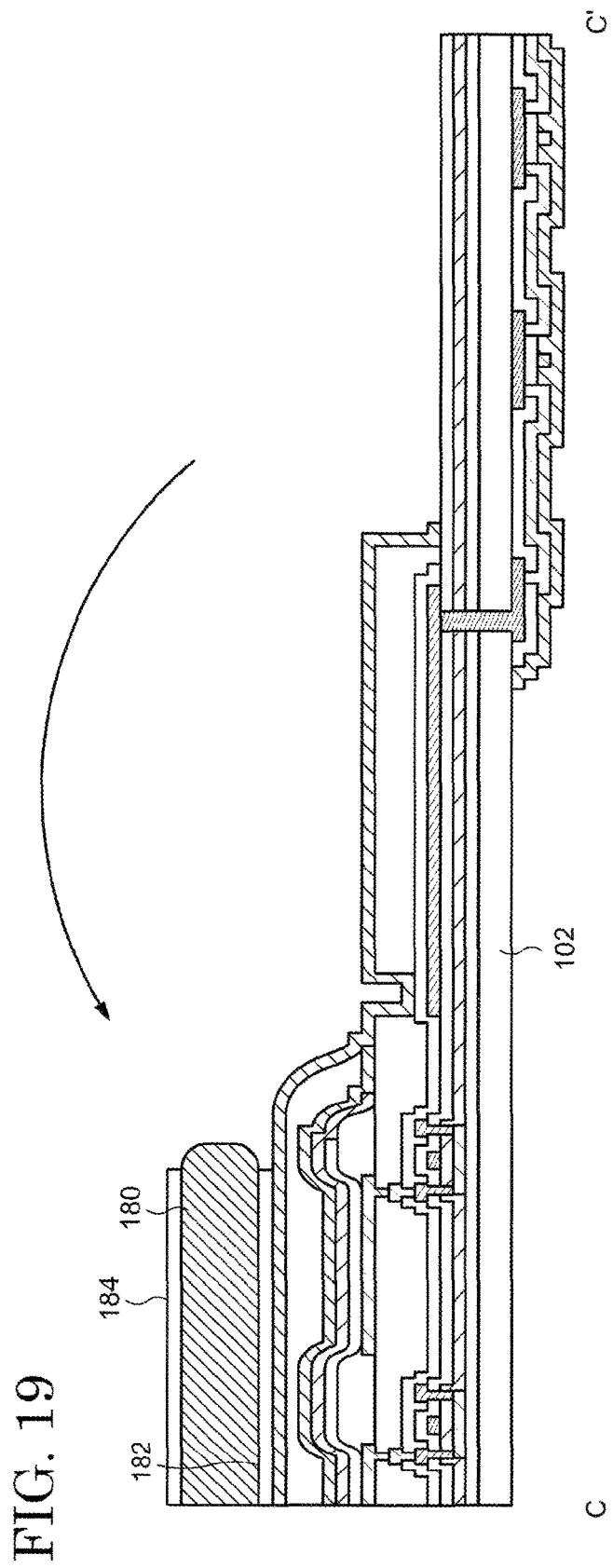
FIG. 19 is a schematic cross-sectional view showing a manufacturing method of a display device according to an embodiment of the present invention.

After that, as shown in FIG. 19, the second supporting substrate 262 is peeled off. Peeling of the second supporting substrate 262 can be carried out with the same method as that of the first supporting substrate 260. The adhesion layer 264 left thereover is removed with dry etching, the transparent substrate 180 is further adhered in the display region 120 with the adhesion layer 182 therebetween, and then the base film 102 is folded as indicated by an arrow in the figure. That is, the base film 102 is folded in the boundary region 160 so that the front face of the touch portion 142 overlaps with the image-displaying portion 122 through the touch portion 142, by which the display device 100 is manufactured.

As described above, the use of the manufacturing method of the present embodiment allows the formation of the image-displaying portion 122 and the touch portion 142 by using one substrate. Hence, the process of the display device 100 can be simplified. As a result, the display device 100 equipped with the touch portion 142 can be produced at a low cost.

Third Embodiment

Figure 20:
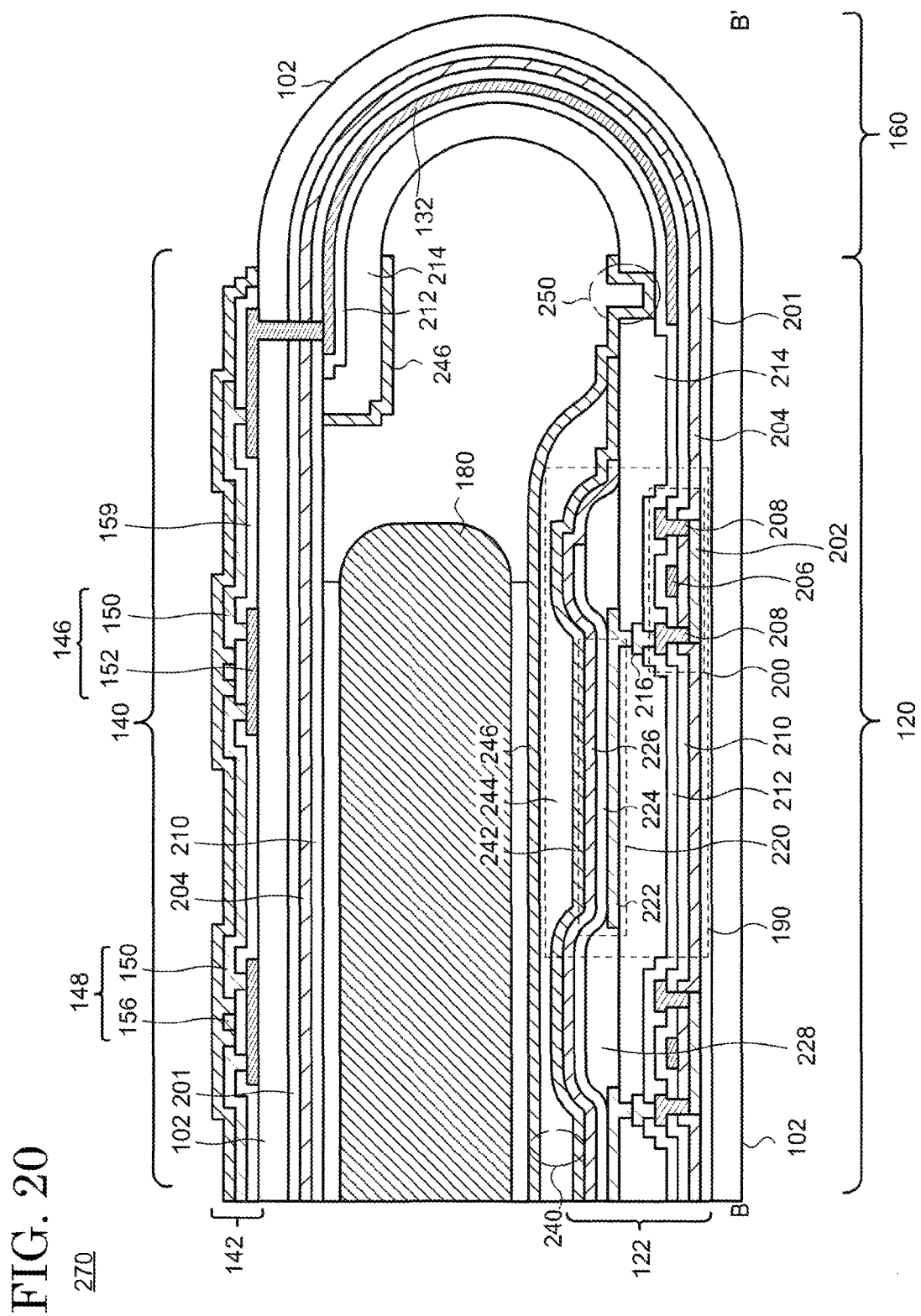
FIG. 20 is a schematic cross-sectional view of a display device according to an embodiment of the present invention.
Figure 21:
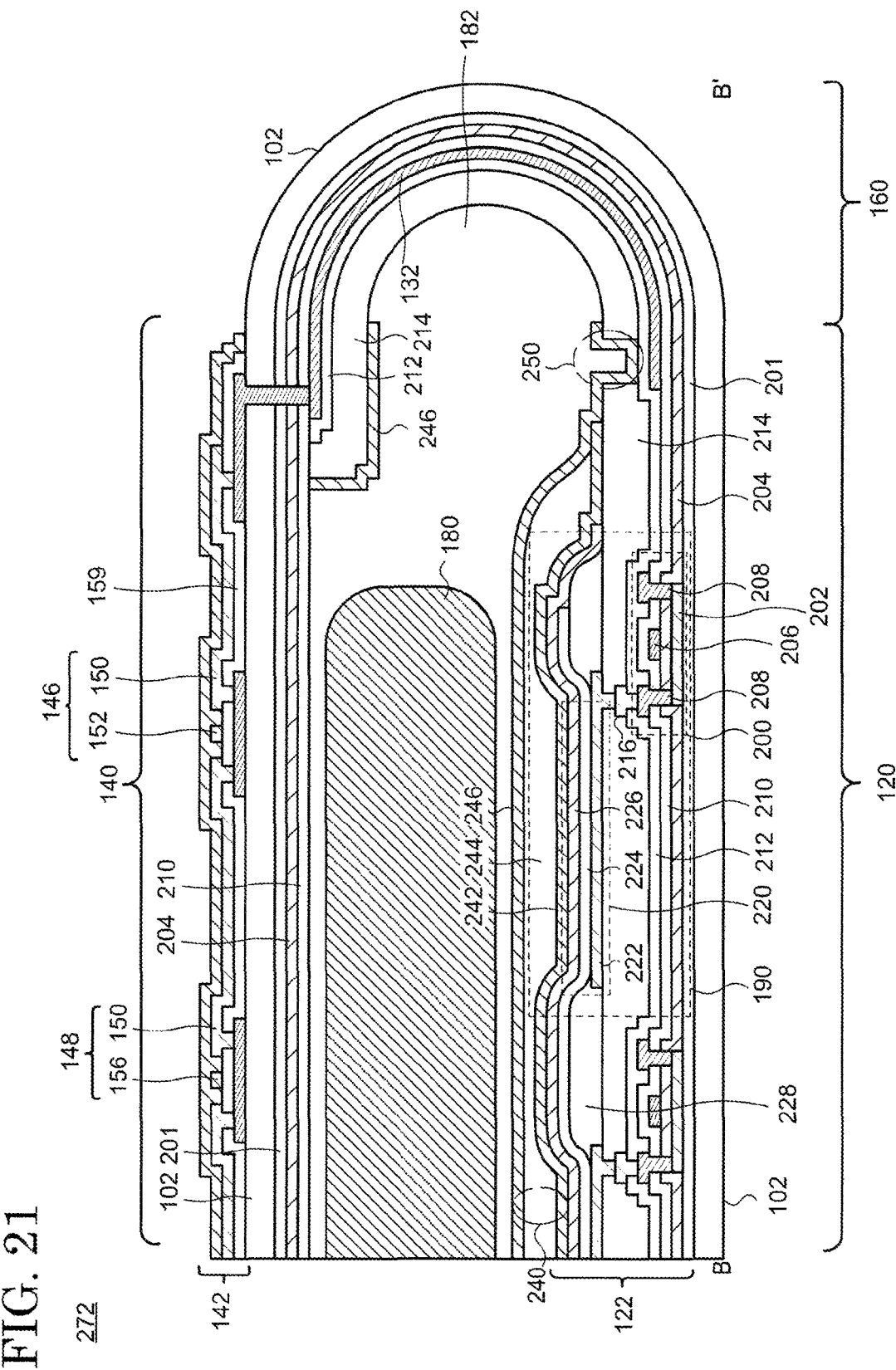
FIG. 21 is a schematic cross-sectional view of a display device according to an embodiment of the present invention.
Figure 22:
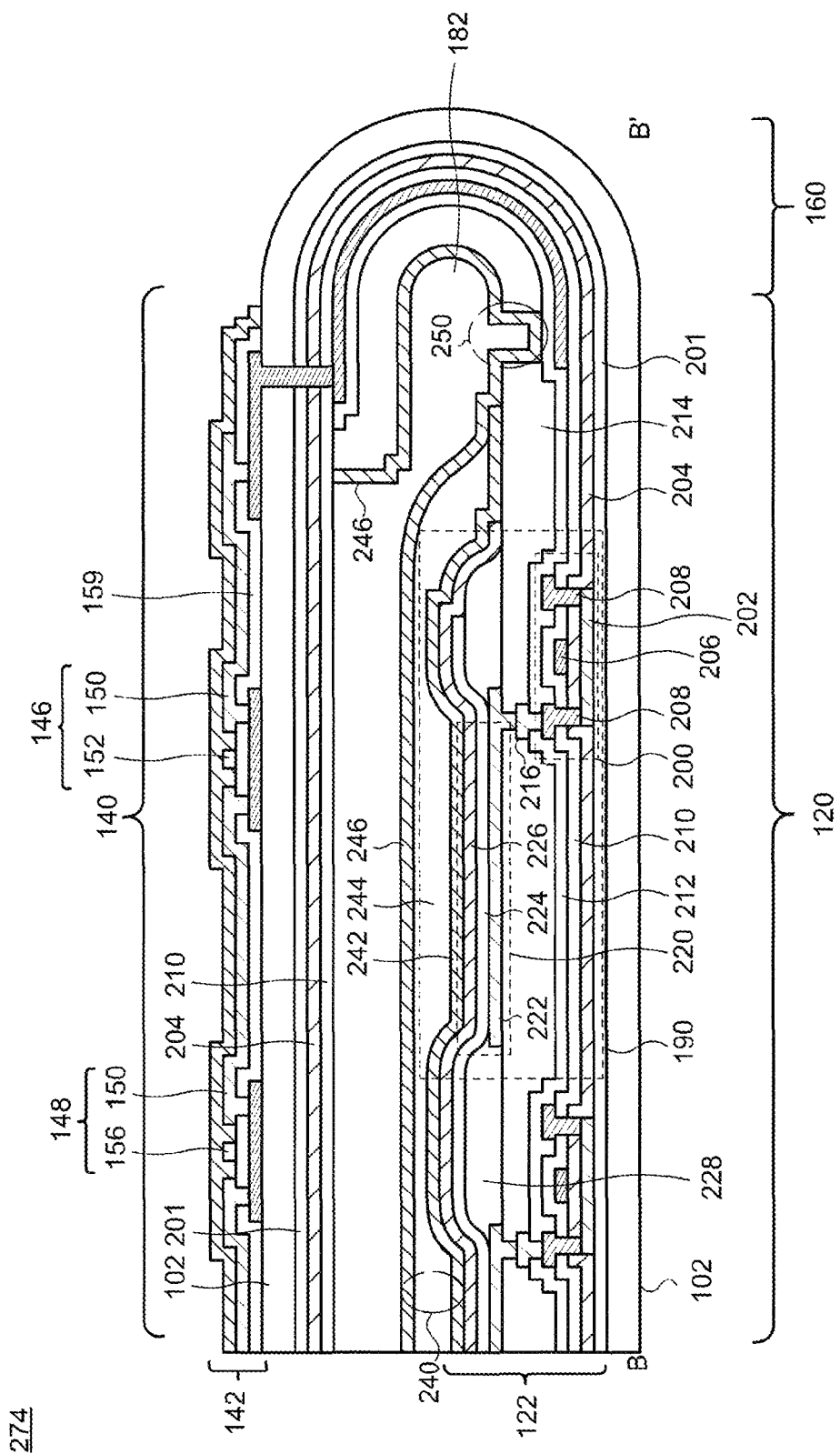
FIG. 22 is a schematic cross-sectional view of a display device according to an embodiment of the present invention.

In the present embodiment, a display device different in structure from the display device 100 is explained by using FIG. 20 to FIG. 22. Explanation of the structures which are the same as those described in the First and Second Embodiments may be omitted. FIG. 20 to FIG. 22 are schematic cross-sectional views along the chain line B-B' in FIG. 1A.

A display device 270 shown in FIG. 20 is different from the display device 100 in that the third layer 246 of the passivation film 240 is not provided in the boundary region 160. As described in the Second Embodiment, the third layer 246 is more rigid than the second layer 244 which can include a polymer material because the third layer 246 may contain an inorganic compound. Hence, selective formation of the third layer 246 in the display region 120 provides higher flexibility to the boundary region 160, which allows the boundary region 160 to be readily folded. Additionally, it is possible to prevent stress from being converged on the wiring 132 in the boundary region 160 because the wiring 132 can be arranged near a neutral plane (a plane on which strain applied when folded is smallest) of the boundary region 160. As described above, it is not necessarily required to provide all of the undercoat 201, the gate insulating film 204, the first interlayer film 210, the second interlayer film 212 and the leveling film 214 in the boundary region 160 and the touch region 140. All of these films may not be provided, or a part of these films may be disposed.

A display device 272 shown in FIG. 21 is different from the display device 100 in that the adhesion layer 182 is provided so as to fill the whole region surrounded by the display region 120, the touch region 140 and the boundary region 160. This structure enables improvement of strength of the boundary region 160 and a periphery thereof.

A display device 274 shown in FIG. 22 is different from the display devices 100 and 272 in that the transparent substrate 180 is not included. When the base film 102 is thin or has high flexibility, for example, the boundary region 160 can be folded tightly. Thus, the display region 120 and the touch region 140 can be adhered to each other by using the adhesion layer 182 even though the transparent substrate 180 is not used. This structure allows production of a flexible display device equipped with a touch panel.

Fourth Embodiment

In the present embodiment, a display device different in structure from the display device 100 of the First Embodiment and the display devices 270, 272, and 274 of the Third Embodiment is explained by using FIG. 23 to FIG. 28. Explanation of the structures which are the same as those described in the First to Third Embodiments may be omitted.

Figure 23:
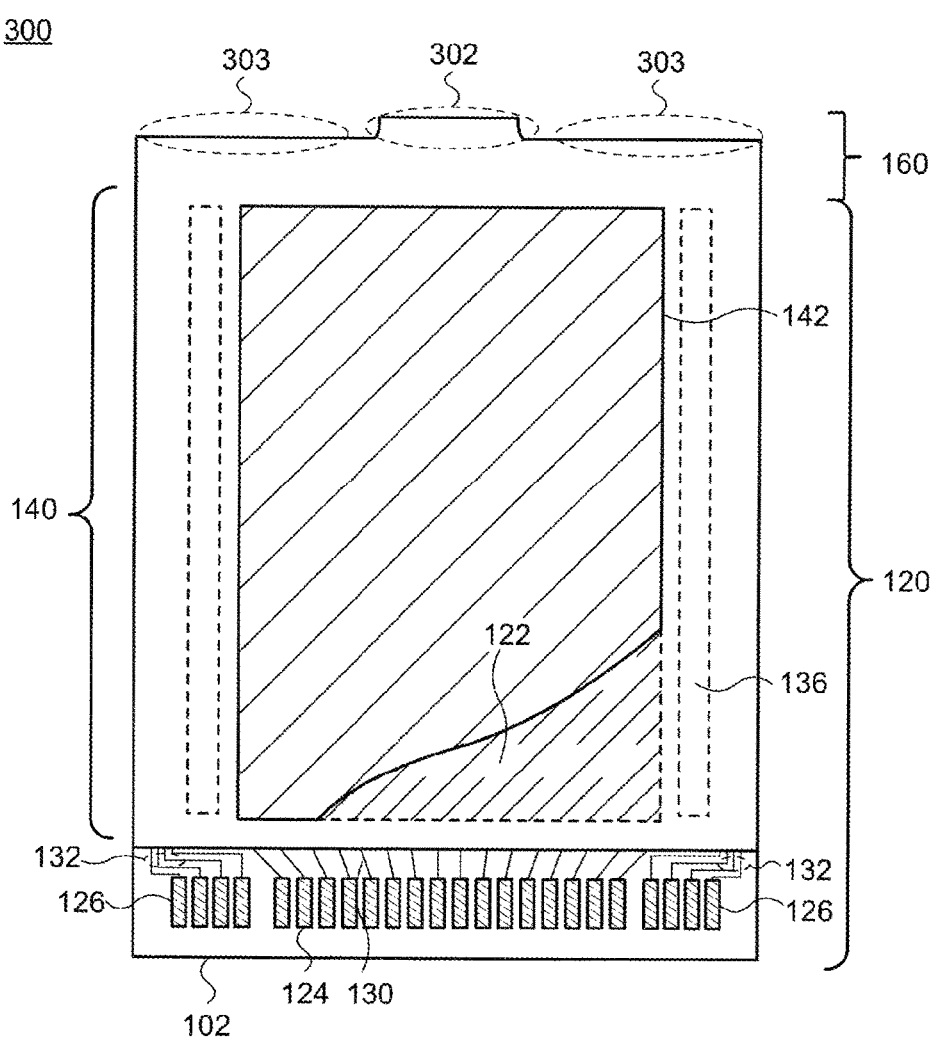
FIG. 23 is a schematic top view of a display device according to an embodiment of the present invention.

A top view of a display device 300 according to a display device of the present embodiment is shown in FIG. 23. The base film 102 possesses a display region 120, the touch region 140 and the boundary region 160. The touch region 140 is located over and overlaps with the display region 120. The display device 300 is different in structure of the boundary region 160 from the display device 100.

Specifically, as shown in FIG. 23, the boundary region 160 is provided with cutoffs parallel to the axis 162 on both sides of a connection portion 302 between the image-displaying portion 122 and the touch portion 142. A width of the connection portion 302 is reduced due to these cutoffs. Note that, in the display device 300, although the connection portion 302 is located at a center of a side of the display device 300, the connection portion 302 may be arranged at a position biased toward any direction.

A shape and a configuration of the connection portion 302 are not limited to those of the display device 300. For example, similar to the display device 320 shown in FIG. 25, the boundary region 160 may possess two connection portions 302. In this case, the cutoffs 303 are arranged on both sides of the two connection portions 302. Alternatively, similar to the display device 330 shown in FIG. 27, two connection portions 302 sandwiching one cutoff 303 may be disposed at edge portions of the base film 102 in the boundary region 160. In this case, the two connection portions 302 may be different in width from each other.

In the display device 300, the wirings 132 connecting the second terminals 126 to the touch portion 142 extend to the touch region 140 passing through the connection portion 302 of the boundary region 160. On the other hand, in the display devices 320 and 330, the wirings 132 connecting the second terminals 126 to the touch portion 142 extend to the touch region 140 passing through the two connection portions 302. In this case, the number of the wirings 132 disposed in the two connection portions 302 may be different from each other. The wirings 132 are each connected to the corresponding wirings 133 through the opening portions 158. The wirings 133 are provided on the opposite face of the base film 102 with respect to the wirings 132.

Figure 24:
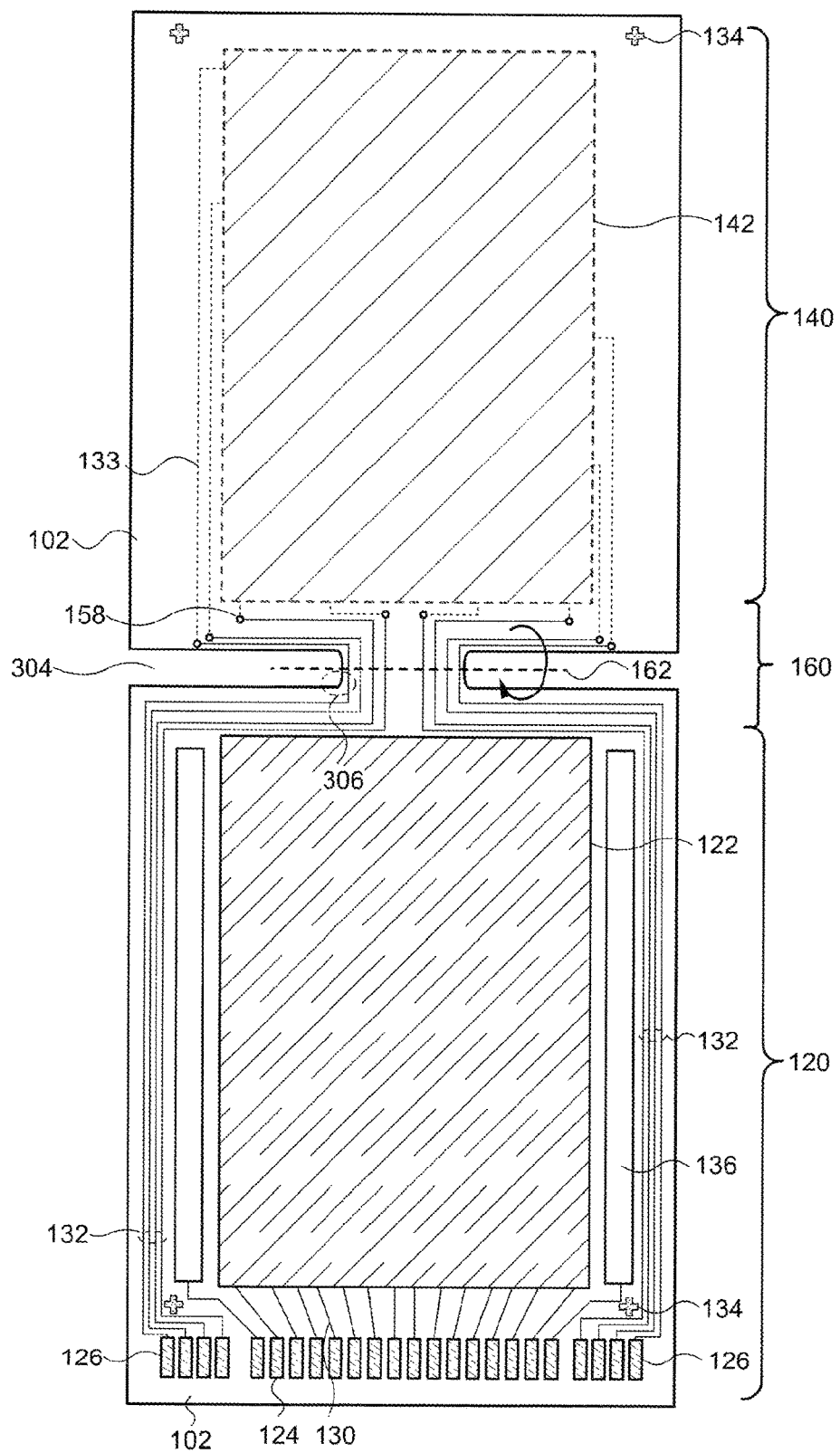
FIG. 24 is a schematic developed view of a display device according to an embodiment of the present invention.
Figure 25:
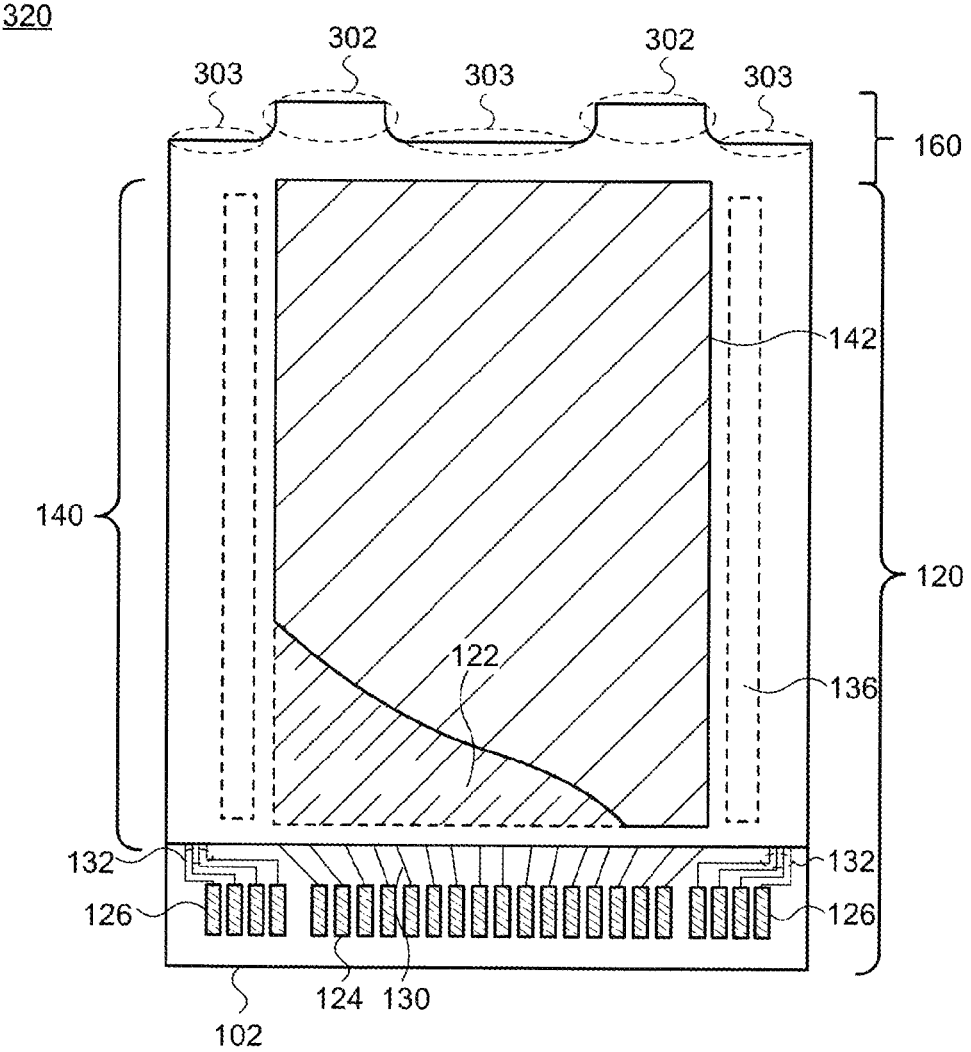
FIG. 25 is a schematic top view of a display device according to an embodiment of the present invention.
Figure 26:
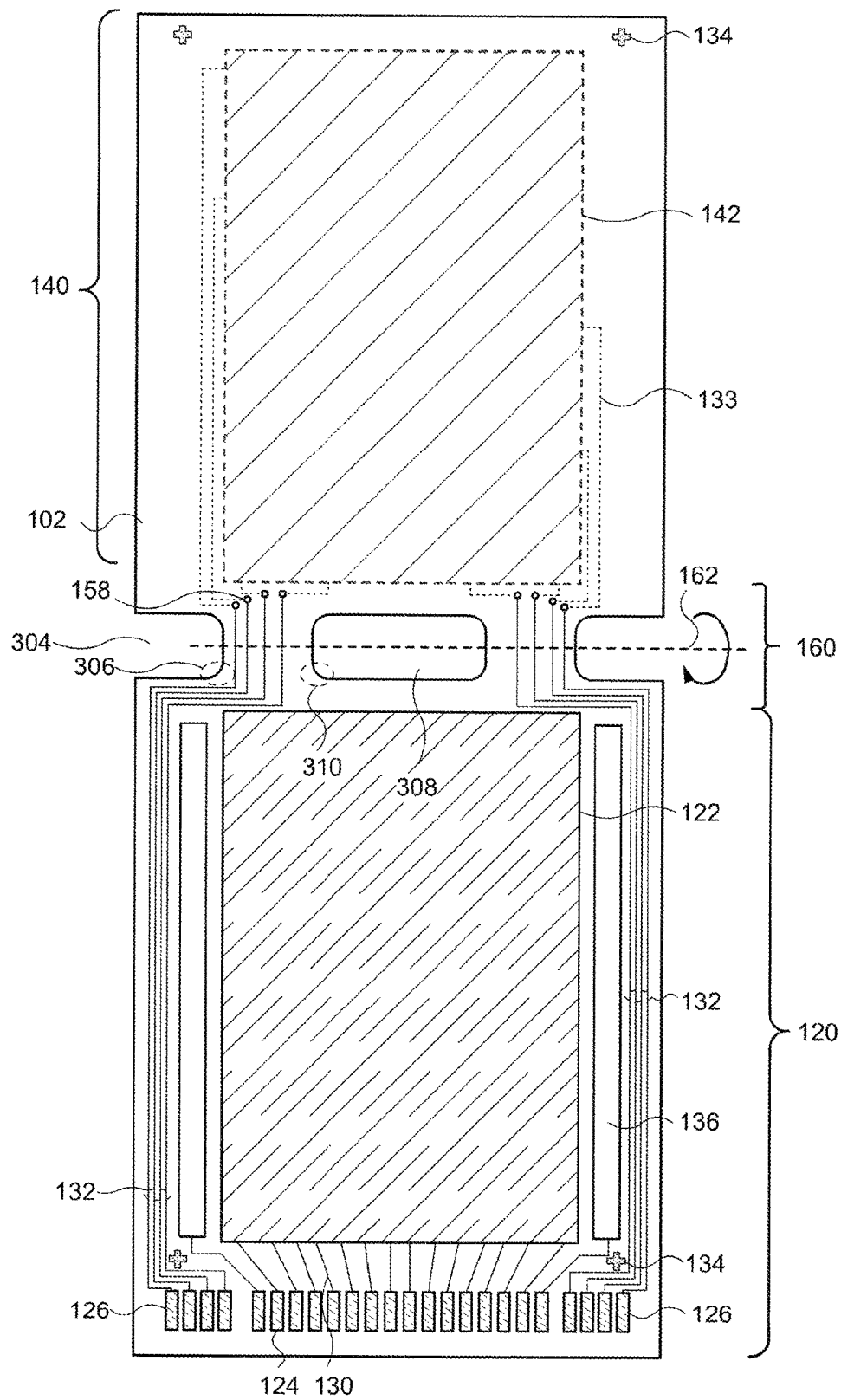
FIG. 26 is a schematic developed view of a display device according to an embodiment of the present invention.
Figure 27:
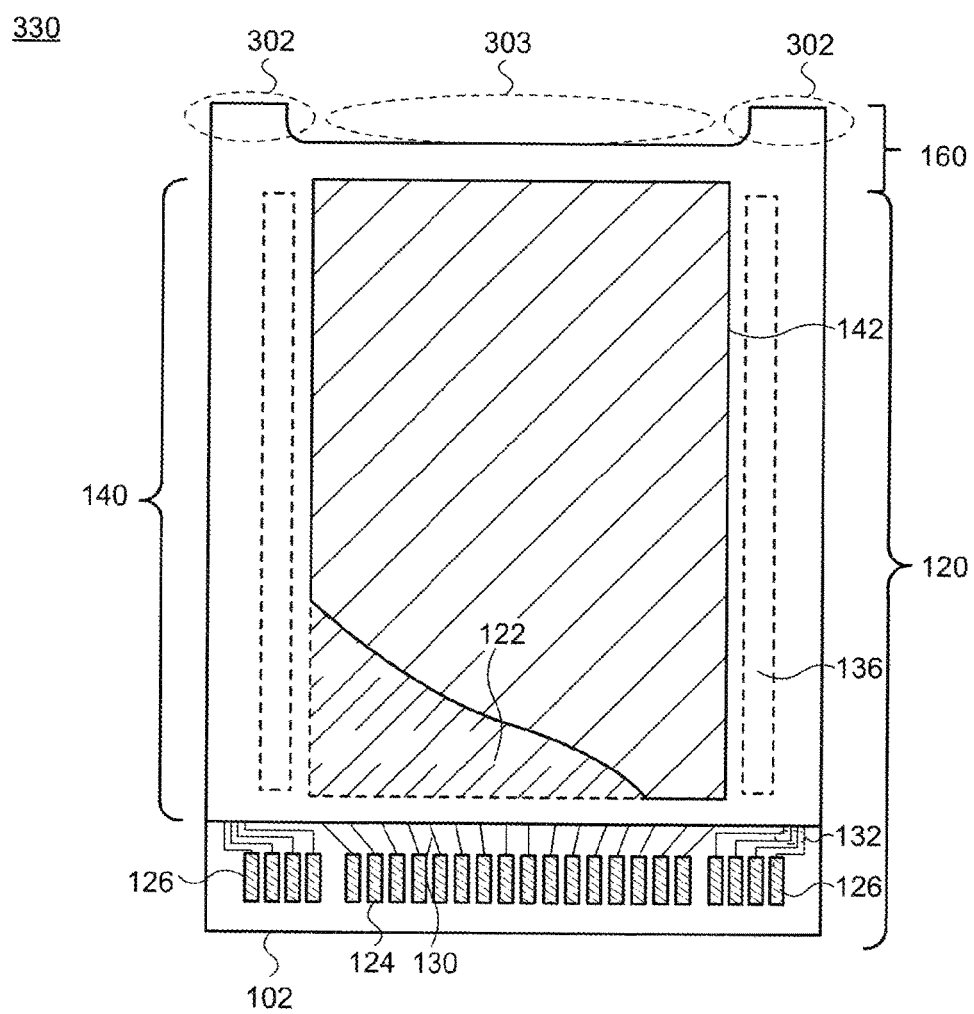
FIG. 27 is a schematic top view of a display device according to an embodiment of the present invention.
Figure 28:
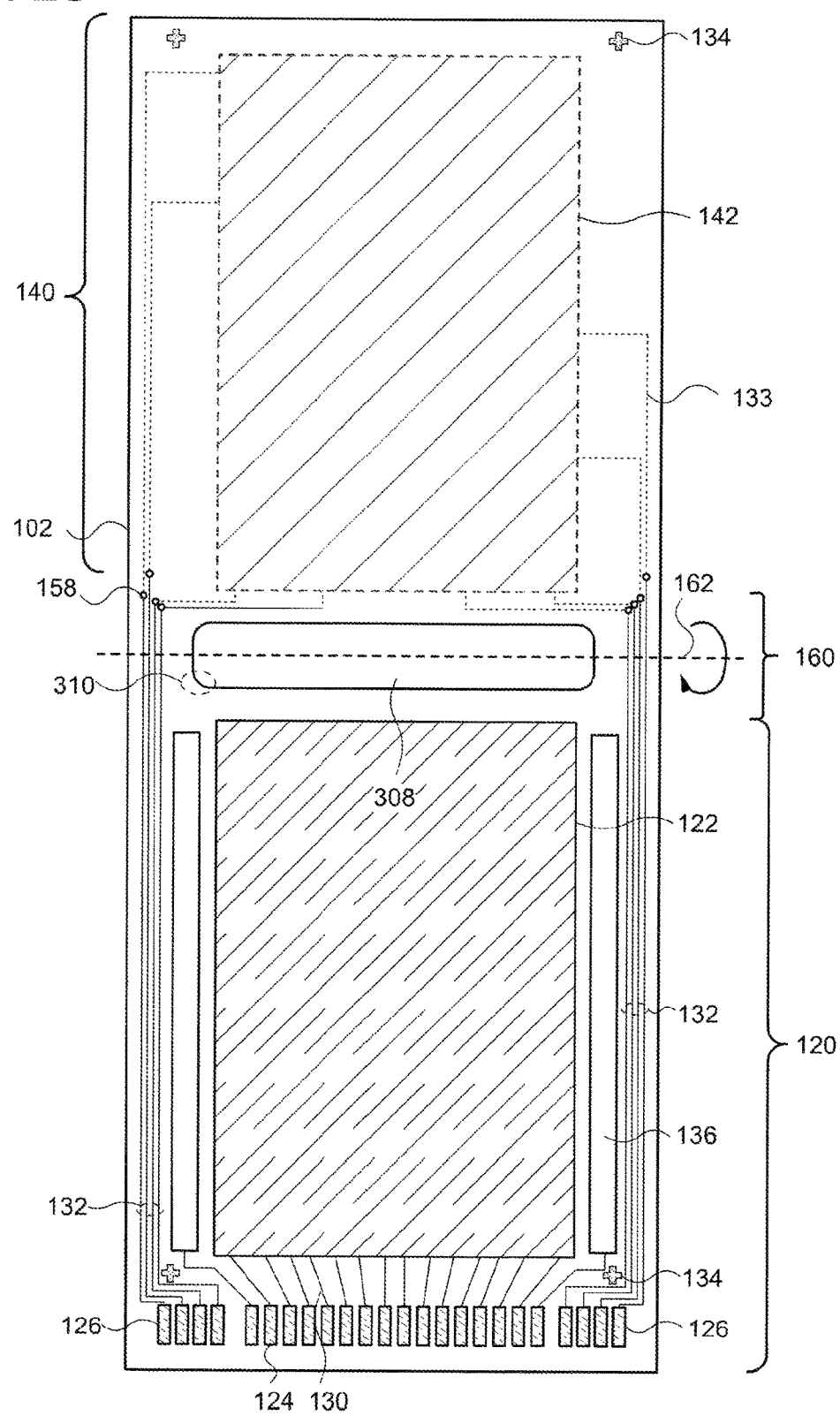
FIG. 28 is a schematic developed view of a display device according to an embodiment of the present invention.

As shown in FIG. 24, the display device 300 with such a structure can be prepared by reducing a width of a part of the base film 102 by providing two slits 304 to the base film 102 in the boundary region 160, followed by folding the base film 102 about the axis 162 passing through the region with the small width. Similarly, as shown in FIG. 26, the display device 320 can be prepared by reducing a width of a part of the base film 102 by providing two slits 304 and an opening portion 308 therebetween to the base film 102 in the boundary region 160, followed by folding the base film 102 in this portion about the axis 162. On the contrary, as shown in FIG. 28, the display device 330 can be prepared by providing the boundary region 160 with the opening portion 308 having a length which is the same as or larger than a width of the image-displaying region 122 or the touch portion 142, followed by folding the base film 102 in this portion about the axis 162. In these display devices 300, 320, and 330, the slits 304 and the opening portion 308 provide the cutoffs 303 when the base film 102 is folded.

The alignment markers 134 are formed in the display region 120 and the touch region 140, and the base film 102 is folded so that the alignment markers 134 overlap with each other, by which the touch region 140 can be stacked in the display region 120 at high productivity and accuracy.

When the display device 300 or 320 is formed, it is preferred that tip portions of the slits 304, that is, corners 306 of the slits 304 have a curved shape (FIG. 24 and FIG. 26). In the same way, it is also preferred that corners 310 of the opening portion 308 formed when the display device 320 or 330 is manufactured have a curved shape (FIG. 26 and FIG. 28). The formation of such a curved shape in the tip portions of the slits 304 and the corners 310 of the opening portion 308 prevents the base film 102 from being damaged and the display region 120 and the touch region 140 from being disconnected from each other.

In the display devices 300, 320, and 330, a width of the folded portion of the boundary region 160 is small, which reduces force when the folded base film 102 returns to its original shape (returning force). Thus, not only the folding process is facilitated, but also the shape of the display devices 300, 320, and 330 can be stably maintained.

The aforementioned modes described as the embodiments of the present invention can be implemented by appropriately combining with each other as long as no contradiction is caused. Furthermore, any mode which is realized by persons ordinarily skilled in the art through the appropriate addition, deletion, or design change of elements or through the addition, deletion, or condition change of a process is included in the scope of the present invention as long as they possess the concept of the present invention.

In the specification, although the cases of the organic EL display device are exemplified, the embodiments can be applied to any kind of display devices of a flat panel type such as other self-emission type display devices, liquid crystal display devices, and electronic paper type display device having electrophoretic elements and the like. In addition, it is apparent that the size of the display device is not limited, and the embodiment can be applied to display devices having any size from medium to large.

It is properly understood that another effect different from that provided by the modes of the aforementioned embodiments is achieved by the present invention if the effect is obvious from the description in the specification or readily conceived by persons ordinarily skilled in the art.

What is claimed is:

1. A display device comprising:
   a base film having a display region, a touch region and a boundary region between the display region and the touch region;
   an image-displaying portion in the display region and on a first face side of the base film; and
   a touch portion in the touch region and on a second face side of the base film,
   wherein:
   the boundary region is sandwiched between the image-displaying portion and the touch portion;
   the base film is folded in the boundary region so that a front face of the touch portion overlaps with the image-displaying portion with the touch portion interposed therebetween;
   the front face of the touch portion is one of opposing faces of the touch portion further from the base film than the other; and
   the image-display portion comprises a pixel including a light-emitting element that is configured so that light from the light-emitting element is extracted through the touch region.

2. The display device according to claim 1, wherein the image-display region is enclosed by the base film.

3. The display device according to claim 1, wherein the touch portion is located over and overlaps with the image-displaying portion with the base film in the touch region interposed therebetween.

4. The display device according to claim 1, further comprising a transparent substrate between the display region and the touch region.

5. The display device according to claim 1, comprising:
a cutoff parallel to a fold axis between both edges of the base film in the boundary region, the cutoff reaching both edges of the base film,
wherein a width of the base film in the boundary region is smaller than a width of the display region and a width of the touch region.

6. The display device according to claim 1,
wherein the base film is flexible.

7. A display device comprising:
a base film having a display region, a touch region and a boundary region between the display region and the touch region;
an image-displaying portion in the display region;
a touch portion in the touch region; and
a terminal in the display region and electrically connected to the touch portion with a wiring extending to the touch region from the display region through the boundary region,
wherein:
the base film is folded in the boundary region so that a front face of the touch portion overlaps with the image-displaying portion with the touch portion interposed therebetween;
the front face of the touch portion is one of opposing faces of the touch portion further from the base film than the other; and
the image-display portion comprises a pixel including a light-emitting element that is configured so that light from the light-emitting element is extracted through the touch region.

8. The display device according to claim 7,
wherein the wiring and the touch portion are electrically connected through an opening portion passing through the base film.

9. The display device according to claim 7,
wherein the touch portion is located over and overlaps with the image-displaying portion with the base film in the touch region interposed therebetween.

10. The display device according to claim 7, further comprising a transparent substrate between the display region and the touch region.

11. The display device according to claim 7, comprising:
a cutoff parallel to a fold axis between both edges of the base film in the boundary region, the cutoff reaching both edges of the base film,
wherein a width of the base film in the boundary region is smaller than a width of the display region and a width of the touch region.

12. The display device according to claim 7,
wherein the base film is flexible.

13. A manufacturing method of a display device, the manufacturing method comprising:
forming an image-displaying portion on a first face side of a base film;
forming a touch portion on a second face side of the base film; and
folding the base film so that the touch portion overlaps with the image-displaying portion and the image-displaying portion is enclosed by the base film,
wherein the image-displaying portion comprises a pixel including a light-emitting element that is configured so that light from the light-emitting element is extracted through the touch region.

14. The manufacturing method according to claim 13, further comprising:
forming a wiring over the base film so as to be electrically connected to the touch portion.

15. The manufacturing method according to claim 14, comprising:
forming an opening portion passing through the base film,
wherein the formation of the touch portion is performed so that the touch portion is electrically connected to the wiring through the opening portion.

16. The manufacturing method according to claim 13, further comprising:
adhering the image-displaying portion and the touch portion to a transparent substrate,
wherein the adhesion of the transparent substrate is performed so that the transparent substrate and a part of the base film are sandwiched between the image-displaying portion and the touch portion.

17. The display device according to claim 1,
wherein the light-emitting element comprises:
a first electrode over the first face of the base film, the first electrode including aluminum, silver, magnesium, or an alloy thereof;
an EL layer over the first electrode; and
a second electrode over the EL layer.

18. The display device according to claim 7,
wherein the light-emitting element comprises:
a first electrode over the first face of the base film, the first electrode including aluminum, silver, magnesium, or an alloy thereof;
an EL layer over the first electrode; and
a second electrode over the EL layer.

19. A manufacturing method according to claim 13,
wherein the light-emitting element comprises:
a first electrode over the first face of the base film, the first electrode including aluminum, silver, magnesium, or an alloy thereof;
an EL layer over the first electrode; and
a second electrode over the EL layer.

20. The display device according to claim 17,
wherein the first electrode has a stacked structure in which a metal is sandwiched by a conductive oxide.

* * * * *